United States Patent
Honda et al.

(10) Patent No.: US 10,632,526 B2
(45) Date of Patent: Apr. 28, 2020

(54) MOLD FOR CONTINUOUS CASTING

(71) Applicant: NIPPON STEEL & SUMITOMO METAL CORPORATION, Tokyo (JP)

(72) Inventors: Tatsuro Honda, Kobe (JP); Nozomu Yoshihiro, Hannan (JP); Shinichi Fukunaga, Kitakyushu (JP); Takeshi Okawa, Kitakyushu (JP)

(73) Assignee: NIPPON STEEL CORPORATION, Tokyo (JP)

( * ) Notice: Subject to any disclaimer, the term of this patent is extended or adjusted under 35 U.S.C. 154(b) by 295 days.

(21) Appl. No.: 15/560,213

(22) PCT Filed: Apr. 8, 2016

(86) PCT No.: PCT/JP2016/061606
§ 371 (c)(1),
(2) Date: Sep. 21, 2017

(87) PCT Pub. No.: WO2016/163536
PCT Pub. Date: Oct. 13, 2016

(65) Prior Publication Data
US 2018/0050387 A1    Feb. 22, 2018

(30) Foreign Application Priority Data

Apr. 8, 2015 (JP) .................. 2015-079244

(51) Int. Cl.
*B22D 11/04* (2006.01)
*B22D 11/16* (2006.01)
(Continued)

(52) U.S. Cl.
CPC ............. *B22D 11/04* (2013.01); *B22D 2/006* (2013.01); *B22D 11/041* (2013.01); *B22D 11/16* (2013.01);
(Continued)

(58) Field of Classification Search
CPC ...... B22D 2/006; B22D 11/181; B22D 11/182
See application file for complete search history.

(56) References Cited

U.S. PATENT DOCUMENTS

| | | | |
|---|---|---|---|
| 2011/0139392 A1* | 6/2011 | Arzberger | B22D 2/006 164/4.1 |
| 2011/0186262 A1* | 8/2011 | Schulze | B22D 2/006 164/151.4 |

FOREIGN PATENT DOCUMENTS

JP     2008-260046     10/2008

* cited by examiner

Primary Examiner — Kevin E Yoon
Assistant Examiner — Jacky Yuen
(74) Attorney, Agent, or Firm — Clark & Brody LP

(57) ABSTRACT

The primary object of the present invention is to provide a mold for continuous casting including a temperature detection unit which can detect the temperature of a copper plate of the mold with high precision, and can be easily inserted into and pulled out of the copper plate. The present invention includes: a main body; and a temperature detection unit which is inserted in an insertion hole in the main body, and detects temperature inside the mold. The temperature detection unit includes: an FBG sensor inserted in a protection tube which can be deformed in a radial direction; and a support member which supports the FBG sensor along the longitudinal direction. At a temperature detection point, the protection tube in which the FBG sensor is inserted is held between a stretched member in the support member and an inner surface of the insertion hole.

20 Claims, 19 Drawing Sheets

(51) Int. Cl.
*B22D 11/18* (2006.01)
*B22D 2/00* (2006.01)
*G01K 1/14* (2006.01)
*G01K 1/12* (2006.01)
*G01K 11/32* (2006.01)
*B22D 11/041* (2006.01)
*G01K 1/08* (2006.01)
*G01L 1/24* (2006.01)

(52) U.S. Cl.
CPC ............. *B22D 11/182* (2013.01); *G01K 1/08* (2013.01); *G01K 1/125* (2013.01); *G01K 1/14* (2013.01); *G01K 1/146* (2013.01); *G01K 11/3206* (2013.01); *G01L 1/246* (2013.01); *G01L 1/247* (2013.01)

MOLD FOR CONTINUOUS CASTING

TECHNICAL FIELD

The present invention relates to a mold for continuous casting for manufacturing a cast slab by cooling and solidifying molten steel.

BACKGROUND ART

A mold for continuous casting is a mold formed by using copper plates. In a mold for continuous casting, a space corresponding to the thickness and the width of a strand to be cast is formed by copper plates, where the space allows passage therethrough in the vertical direction. In addition, in order to cool and solidify molten steel poured in a mold, the outer surface (the cooled surface) of each copper plate is cooled. Molten steel poured from the upper side of a mold for continuous casting as above into a mold is cooled and solidified from a portion in contact with the inner surface (the molten-steel surface) of each copper plate, and pulled out downward in succession while being solidified.

Cooling of a mold is effected by water cooling of the outer surfaces of the copper plates. For example, as illustrated in FIG. 19, a large number of water-introducing grooves 2c are formed on the outer surface (cooled surface) 2b of a copper plate 2 which constitutes a mold. On the other hand, the outer surface 2b of the copper plate 2 suppresses deformation of the copper plate 2 which may be caused by thermal stress occurring in the copper plate 2, and is fixed with bolts 8 at multiple positions to a lid made of copper and called a back plate 4, which is a strength member for retaining the inner dimensions and shape of the mold. Thus, the opening portions of the water-introducing grooves 2c are covered by the back plate 4, and water-flow channels in which cooling water flows w are formed.

In addition, a hole 2d is formed in the copper plate 2 so as to evade the water-introducing grooves 2c and penetrate from the back plate side 4b through the back plate 4 into the copper plate 2. A temperature detection unit 6 which detects the mold temperature is inserted into the hole 2d. Conventionally, a sheathed thermocouple or the like has been used as the temperature detection unit 6. The detection result of the temperature detection unit 6 is provided for monitoring the situation in the mold, and is used, for example, for detection of a trouble such as a breakout. In the breakout, a shell as an outer-surface solidified portion of molten steel breaks and the molten steel leaks out. In addition, it is said that the temperature distribution occurring in the copper plate 2 reflects, for example, the flow of the molten steel in the mold. The detection result of the temperature detection unit 6 is also used for monitoring of judgment as to whether or not the quality of the slab is good.

The temperature detection unit 6 is inserted into the hole 2d from the back plate 4 side, and installed by fixing a fixing portion 6a to the back plate 4 as illustrated in FIG. 19. The fixing portion 6a is, for example, a screw member, and the temperature detection unit 6 can be fixed to the back plate 4 by screwing the fixing portion 6a into a thread groove formed in the vicinity of the opening of the hole 2d in the back plate 4. At this time, the temperature detection unit 6 is arranged in such a manner that the tip end of the thermocouple as a temperature detection point is located on a molten-steel surface 2a side of the tip ends (the bottoms of the grooves) of the water-introducing grooves 2c in the thickness direction of the copper plate 2. Because a temperature gradient, which is approximately a linear interpolation between the cooling water temperature and the temperature of the molten-steel surface 2a, is formed between the tip ends of the water-introducing grooves 2c and the molten-steel surface 2a, the temperature of the molten-steel surface 2a can be estimated by locating the temperature detection point of the temperature detection unit 6 between the tip ends of the water-introducing grooves 2c and the molten-steel surface 2a.

CITATION LIST

Patent Literature

Patent Literature 1: Japanese Patent Laid-open No. 2008-260046

SUMMARY OF INVENTION

Technical Problem

However, in the case where the temperature detection unit 6 is arranged as illustrated in FIG. 19, the hole 2d in which the temperature detection unit 6 is inserted and the water-introducing grooves 2c are formed side by side in the copper plate 2. Therefore, there is a possibility that the cooling water flowing through the water-introducing grooves 2c intrudes into the hole 2d through the gap between the cooled surface 2b of the copper plate 2 and a surface 4a on one side of the back plate 4 which faces the cooled surface 2b, and impedes the temperature detection by the temperature detection unit 6.

Further, when an attempt is made to significantly increase the temperature detection points in the conventional mold, the number of the holes 2d increases. Therefore, the possibility of water intrusion into the holes 2d increases, and there is apprehension about malfunction (such as the water intrusion or increase in thermal distortion of the copper plate) due to decrease in the strength of the back plate 4 and the like. Furthermore, in some cases, spacing between adjacent water-introducing grooves 2c is made greater in a portion in which the temperature detection unit 6 is installed than in a portion in which the temperature detection unit 6 is not installed, between the water-introducing grooves 2c. Therefore, when the hole 2d between the water-introducing grooves 2c is newly formed and the temperature detection unit 6 is installed in the conventional mold, there is a possibility that the average spacing between the water-introducing grooves 2c increases and the cooling efficiency is lowered. Moreover, the temperature detection unit 6 is a consumable item which is to be replaced with a new one at the time of maintenance of the mold. Therefore, in some cases, the number of the temperature detection units 6 cannot be easily increased.

In addition, the thermocouple used as the temperature detection unit 6 is a non-grounded sheathed thermocouple having the outer diameter of 3.2 mm from the viewpoints of durability and suppression of electromagnetic noise. This thermocouple may not precisely reflect the temperature of the bottom portion of the hole because of causes including: the thickness of the metal sheath (formed of, for example, stainless steel) occupying approximately 10% (i.e., approximately 0.3 mm) or more of the outer diameter; the heat capacity of a strand (of an alloy of Ni and Cr) having the diameter equal to or more than approximately 15% of the outer diameter, the electrically insulating materials occupying the gap between the strand and the sheath, and the like; and the variation in the responsiveness caused by, for example, variations in the contact thermal resistance between the outer surface of the sheath and the inner surface of the hole in the copper plate.

On the other hand, in recent years, there has been a tendency to increase the number of the temperature detection points of the temperature detection units 6 with the needs for multi-point measurement of the mold temperature. Therefore, the temperature measurement using multiple thermocouples or the temperature measurement using Fiber Bragg Grating (which is hereinafter referred to as FBG) is adopted. An FBG sensor is easier to be installed than the thermocouple, and realizes highly precise stable multi-point measurement. An FBG sensor is a kind of an optical-fiber sensor, and has a structure in which a grating is formed by laminating multiple layers having different refractive indexes in a core portion of an optical fiber so as to allow reflection and transmission of only the light having a wavelength determined by the grating space and the refractive index. The variations in the refractive index and distortion (i.e., expansion and contraction) which are caused by the temperature of the FBG change the grating period of the FBG and the reflected wavelength. Thus, the temperature at the position of the FBG can be obtained by inputting white light (light having a spectrum smoothly extending in a wide wavelength range) into an FBG sensor and detecting the wavelength of the reflected light by a spectrometer.

In an FBG sensor as above, the temperature detection points can be determined according to the detected wavelength range, temperature range, and the like. Therefore, for example, tens of temperature detection points per optical fiber can be arranged at arbitrary positions. In this case, the intervals between the temperature detection points can be set to approximately 10 mm, so that the temperature measurement using the FBG is superior in the spatial resolution. In addition, since the light propagating in the optical fiber is utilized for signal transmission, the temperature measurement using the FBG has the advantage of not being affected by the electric noise which can be produced by, for example, electromagnetic brakes.

However, it is common that an FBG sensor is fixedly installed in a copper plate, for example, as disclosed in Patent Literature 1 mentioned above, and it is difficult to easily attach or detach an FBG sensor to and from a copper plate. In the case where an FBG sensor is fixedly installed in a copper plate, the FBG sensor is to be discarded every time the copper plate is replaced. That is, the FBG sensor cannot be repeatedly used.

The present invention was made in order to solve the above problems, and an object of the present invention is to provide a novel and improved mold for continuous casting which has a temperature detection unit capable of detecting a temperature of a copper plate with high accuracy, and capable of being easily attached to and detached from the copper plate.

Solution to Problem

In order to solve the aforementioned problems, according to an aspect of the present invention, a mold for continuous casting is provided. This mold for continuous casting includes: a main body of the mold for continuous casting; and a temperature detection unit which is inserted in an insertion hole formed in the main body of the mold, and detects temperature inside the mold. The temperature detection unit includes, an FBG (fiber Bragg grating) sensor inserted in a protection tube which can be deformed in a radial direction, and a support member in which a groove is formed along a longitudinal direction, and which supports the FBG sensor along the longitudinal direction. At a temperature detection point, the protection tube in which the FBG sensor is inserted is held between a stretched member stretched across an opening of the groove in the support member and an inner surface of the insertion hole.

In addition, another mold for continuous casting is provided. This mold for continuous casting includes: a main body of the mold for continuous casting; and a temperature detection unit which is inserted in an insertion hole formed in the main body of the mold, and detects temperature inside the mold. The temperature detection unit includes, two FBG sensors respectively inserted in protection tubes which can be deformed in a radial direction, and a support member in which two grooves opposed in a radial direction are formed along a longitudinal direction, and which supports the two FBG sensors along the longitudinal direction. At temperature detection points, the protection tubes in which the FBG sensors are inserted are each held between a stretched member stretched across openings of the respective two grooves in the support member and an inner surface of the insertion hole.

The mold for continuous casting may be configured such that in the insertion hole, one of the FBG sensors is arranged on a molten-steel face side of the main body of the mold, and the other of the FBG sensors is arranged on a cooled face side of the main body of the mold.

The temperature detection unit may be inserted from at least one of upper, lower, and lateral sides of the main body of the mold.

The FBG sensor(s) may be arranged on a diameter, in a thickness direction of the main body of the mold, of the insertion hole.

In addition, the protection tube(s) is/are formed to have an inner diameter of no more than 0.5 mm, and the inner diameter(s) of the protection tube(s) is/are greater than (an) outer diameter(s) of the FBG sensor(s) even when the protection tube(s) is/are deformed in the radial direction.

The support member may include, along the longitudinal direction, a small diameter portion on which the stretched member is arranged and a large diameter portion having a diameter greater than the small diameter portion, and the temperature detection point(s) of the FBG sensor(s) is/are located in the small diameter portion.

The FBG sensor(s) may be arranged between an outer side of the stretched member and an inner surface of the insertion hole at the temperature detection point(s), and arranged an inner side of the stretched member opposed to (an) inner surface(s) of the groove(s) in the small diameter portion not containing the temperature detection point(s).

For example, a heat-resistant fiber in a string-like or a film-like form may be used for the stretched member.

Advantageous Effect of Invention

As explained above, according to the present invention, it is possible to provide a mold for continuous casting which has a temperature detection unit capable of detecting a temperature of a copper plate with high accuracy, and capable of being easily attached to and detached from the copper plate.

DESCRIPTION OF EMBODIMENTS

Hereinbelow, a preferred embodiment of the present invention will be explained in detail with reference to accompanying drawings. In this specification and the drawings, identical reference numbers are affixed to constituents having substantially identical functions or configurations, and the explanations on such constituents are not repeated.

1. First Embodiment

<1-1. Outline of Configuration of Mold for Continuous Casting>

Figure 1:
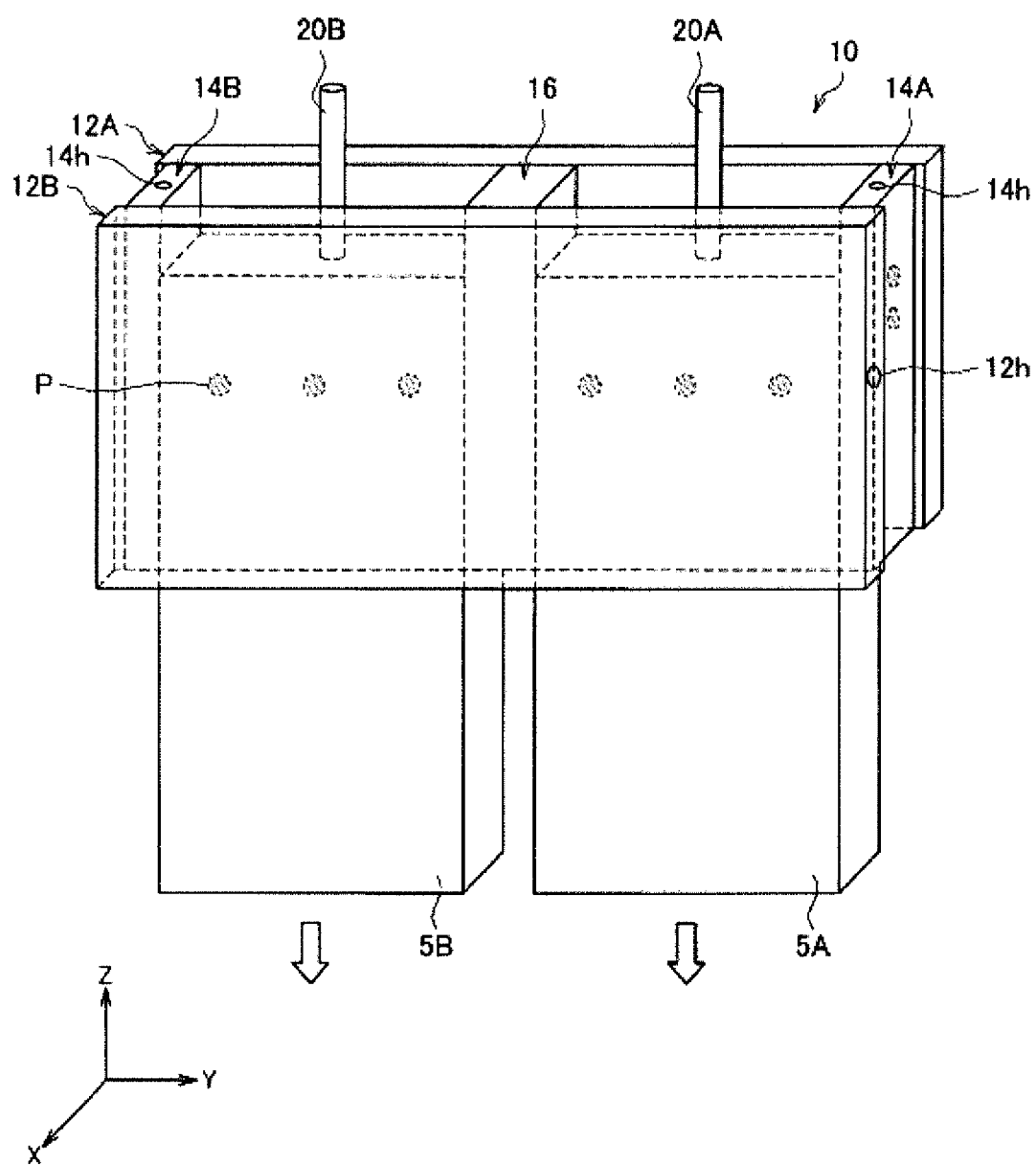
FIG. 1 is a schematic perspective diagram schematically illustrating a configuration of a mold for continuous casting according to the first embodiment of the present invention.
Figure 2:
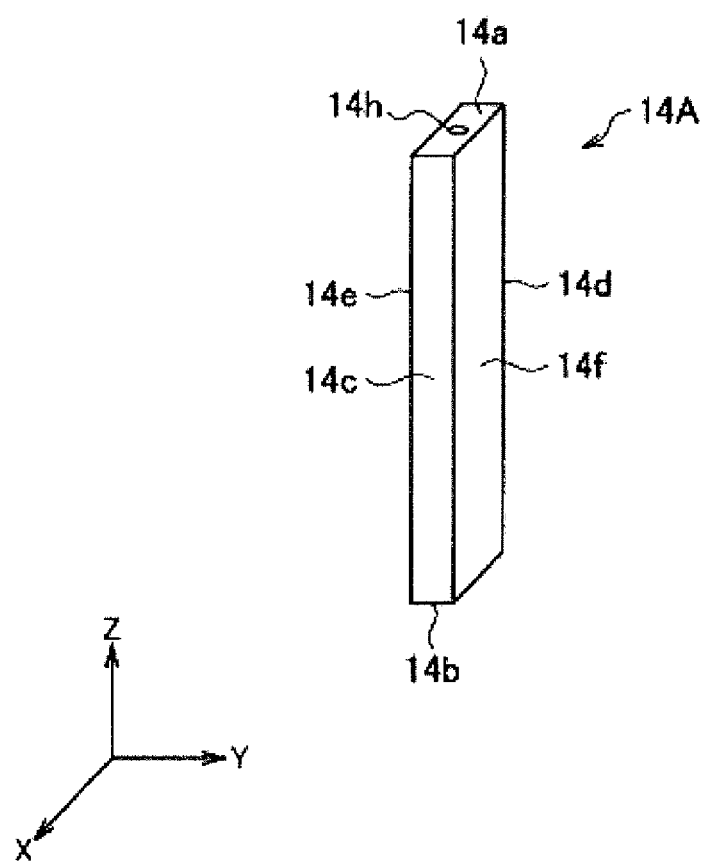
FIG. 2 is a schematic perspective diagram illustrating a copper plate on a shorter side of the mold for continuous casting according to the above embodiment.
Figure 3:
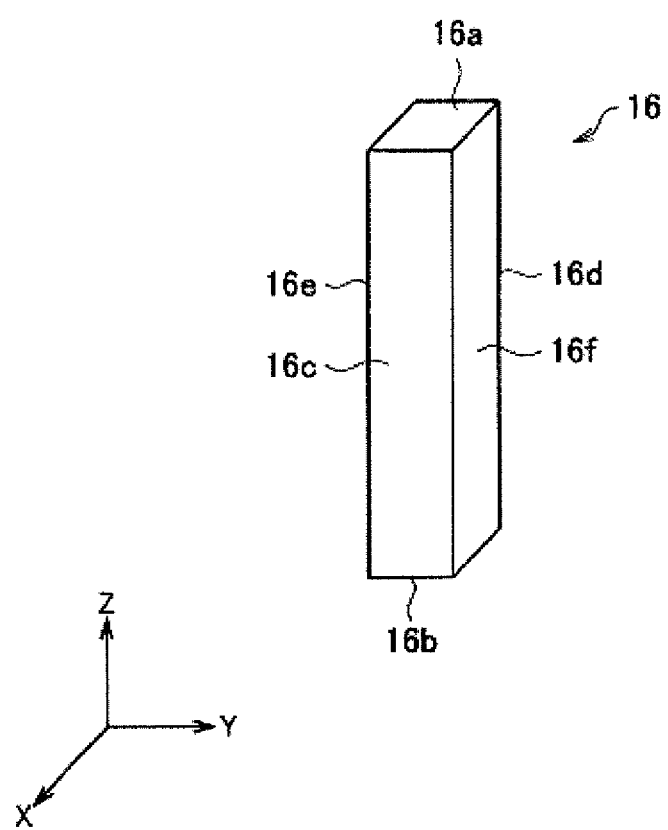
FIG. 3 is a schematic perspective diagram illustrating a partition plate in the mold for continuous casting according to the above embodiment.

First, an outline of a configuration of a mold for continuous casting according to the first embodiment of the present invention is explained based on FIGS. 1 to 3. FIG. 1 is a schematic perspective diagram schematically illustrating the outline of a configuration of a mold for continuous casting 10 according to the present embodiment. FIG. 2 is a schematic perspective diagram illustrating a copper plate 14A on a shorter side of the mold for continuous casting 10 according to the present embodiment. FIG. 3 is a schematic perspective diagram illustrating a partition plate 16 in the mold for continuous casting 10 according to the present embodiment. In FIG. 1, the dimension in the X-direction is the mold thickness, the dimension in the Y-direction is the mold width, and the dimension in the Z-direction is the mold height.

The mold for continuous casting 10 (which may be hereinafter simply referred to as "the mold") is a mold formed with copper plates, specifically, by combining copper plates 12A and 12B on the longer sides and copper plates 14A and 14B on the shorter sides as illustrated in FIG. 1. The dimensions of the copper plates 12A and 12B and the copper plates 14A and 14B are determined by the thickness and the width of the cast slab to be produced. For example, in the case where a slab for a steel plate is produced, the copper plates 12A and 12B on the longer sides have a width (the dimension in the Y-direction) of approximately several meters, a height (the dimension in the Z-direction) of slightly smaller than 1 m, and a thickness (the dimension in the X-direction) of approximately 30 to 40 mm, and the copper plates 14A and 14B on the shorter sides have a width (the dimension in the X-direction) of approximately 250 mm, a height (the dimension in the Z-direction) of approximately 1 m, and a thickness (the dimension in the Y-direction) of approximately 30 to 40 mm.

Side faces (faces facing in the X-direction) 14c and 14d of the copper plates 14A and 14B on the shorter sides are arranged respectively in contact with the molten-steel surfaces of the copper plates 12A and 12B on the longer sides as illustrated in FIG. 1. The mold width can be changed by moving the copper plates 14A and 14B on the shorter sides in the Y-direction along the molten-steel surfaces of the copper plates 12A and 12B on the longer sides. Hereinafter, on the copper plates 14A and 14B on the shorter sides, one, facing upward, of the faces facing in the vertical direction (Z-direction), is referred to as an upper face 14a, and the other, facing downward, of the faces facing in the vertical direction is referred to as a lower face 14b. In addition, the faces facing in the width direction (X-direction) are referred to as the side faces 14c and 14d. Further, one, in contact with molten steel, of the faces facing in the thickness direction (Y-direction), is referred to as a molten-steel face 14e, and the other of the faces facing in the thickness direction is referred to as a cooled face 14f. Although only the copper plate 14A is illustrated in FIG. 2, the copper plate 14B is similar to the copper plate 14A. However, on the copper plate 14B, the face toward the positive direction along the Y-axis is the molten-steel face 14e, and the face toward the negative direction along the Y-axis is the cooled face 14f.

In the mold for continuous casting 10 according to the present embodiment, in some cases, a copper plate is arranged as the partition plate 16 inside the mold 10 as illustrated in FIG. 1. The provision of the partition plate 16 partitions the inner space of the mold 10 in which the molten steel is to be poured into two, and enables parallel manufacturing of two cast slabs 5A, 5B. Hereinafter, on the partition plate 16, as illustrated in FIG. 3, one, facing upward, of the faces facing in the vertical direction (Z-direction), is referred to as an upper face 16a, and the other, facing downward, of the faces facing in the vertical direction is referred to as a lower face 16b. In addition, the faces facing in the width direction (X-direction) are referred to as side faces 16c and 16d. Further, in contrast to the copper plates 12A, 12B, 14A, and 14B on the longer and shorter sides, both faces facing the thickness direction (Y-direction) of the partition plate 16 are molten-steel faces 16e and 16f, which are to be in contact with the molten steel.

The molten-steel faces, which are to be in contact with the molten steel, of the copper plates 12A, 12B, 14A, and 14B and the partition plate 16 constituting the mold 10 are coated with plating which contains Ni or the like as a main component. The mold 10 allows passage therethrough in the vertical direction. Molten steel is poured into the mold 10 from pouring nozzles 20A and 20B, which are arranged in the upper side of the mold 10, and this molten steel is pulled out downward while being solidified. At this time, in order to cool and solidify the molten steel poured into the mold 10, the outer side faces (cooled faces) sides of the copper plates are cooled. Therefore, the molten steel poured into the mold from the upper side of the mold 10 is cooled, and pulled out downward in succession while being solidified from a portion in contact with the molten-steel faces.

Every time the casting as above is repeated, the molten-steel faces of the copper plates 12A, 12B, 14A, and 14B, and the partition plate 16 deteriorate, for example, the molten-steel faces are scraped, and the plating applied to the faces is reduced. Therefore, after being used for a certain time, the copper plates 12A, 12B, 14A, and 14B, and the partition plate 16, together with the back plate, are detached from a continuous casting machine. Then, the molten-steel faces are cut to the depths of several millimeters and smoothened flat, and are then plated. Thereafter, the copper plates 12A, 12B, 14A, and 14B, and the partition plate 16 are again assembled to the back plate for reuse.

A temperature detection unit 100 for detecting the mold temperature is arranged in the mold for continuous casting 10 according to the present embodiment. Thus, detection of a trouble during continuous casting, monitoring of the flow of the molten steel in the mold, and other operations are enabled on the basis of the results of detection by the temperature detection unit 100. In the present embodiment, an FBG sensor is used as the temperature detection unit 100. Details of the temperature detection unit 100 will be described later. The temperature detection unit 100 is formed by fixing the FBG sensor to a rod-like support member, and is installed by insertion into a hole formed in a copper plate of the mold 10.

It is preferable that the insertion hole, in which the temperature detection unit 100 is inserted, be formed at a position where the temperature detection unit 100 can be easily attached to and detached from a copper plate. For example, the insertion hole can be formed on upper and lower faces of the copper plates 12A, 12B, 14A, and 14B and the side faces of the copper plates 12A and 12B. In FIG. 1, an insertion hole 12h is formed on a side face of the copper plate 12B, and insertion holes 14h, 14h are respectively formed on the upper faces of the copper plates 14A and 14B. In addition, the temperature detection unit 100 according to the present embodiment can also be installed by insertion from the upper face of the partition plate 16. The insertion holes formed in the above copper plates are thin holes having inner diameters of approximately 3 to 4 mm, and are formed to have a depth of, for example, 150 mm or greater. Therefore, the mold 10 provided with the temperature detection unit 100 according to the present embodiment can be produced by a small modification of the existing mold.

Hereinbelow, the configuration of the temperature detection unit 100 which is used by being inserted in the insertion hole formed in the mold for continuous casting 10 is explained in detail based on FIGS. 4 to 11.

<1-2. Temperature Detection Unit>
(1) Outline of Configuration

Figure 4:
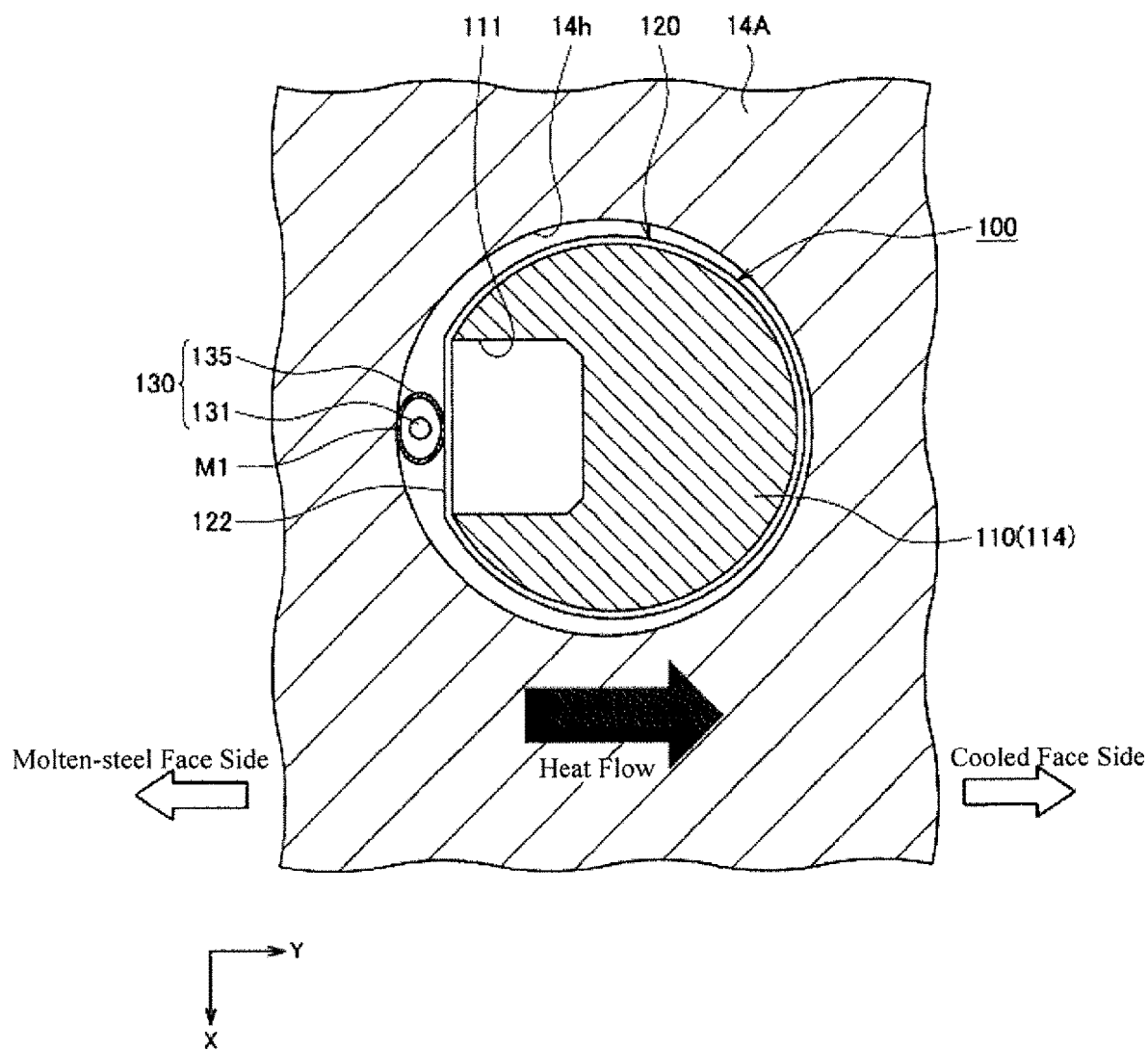
FIG. 4 is a schematic cross-sectional diagram illustrating a situation of a temperature detection point in a temperature detection unit according to the above embodiment, where the temperature detection unit is installed in an insertion hole in the copper plate in the mold for continuous casting.

First, an outline of the configuration of the temperature detection unit 100 is explained with reference to FIG. 4. FIG. 4 is a schematic cross-sectional diagram illustrating a situation of a temperature detection point in the temperature detection unit 100 according to the present embodiment, where the temperature detection unit 100 is installed in the insertion hole 14h in the copper plate 14A in the mold for continuous casting 10. In FIG. 4, the molten-steel face 14e of the copper plate 14A is located on the left side of the illustration of FIG. 4, and the cooled face 14d of the copper plate 14A is located on the right side of the illustration of FIG. 4. In addition, in FIG. 4, and FIGS. 5 and 8 to 10 which are explained later, each member constituting the temperature detection unit 100 is illustrated in a partially magnified manner for the purpose of illustration. In the following explanations, the temperature detection unit 100 inserted in the insertion hole 14h in the copper plate 14A on the shorter side is explained as an example. However, the temperature detection unit 100 is also installed similarly in the insertion holes in the other copper plates in the mold 10.

As illustrated in FIG. 4, the temperature detection unit 100 according to the present embodiment is constituted by a support member 110, a stretched member 120, and a sensor unit 130. The sensor unit 130 is formed by inserting an FBG sensor 131, which detects the temperature of the copper plate 14A, in a hollow protection tube 135. The protection tube 135 is arranged for preventing damage to the FBG sensor 131. The sensor unit 130 is fixed to the support member 110, and inserted in the insertion hole 14h in the copper plate 14A.

A groove 111 is formed along the longitudinal direction in the support member 110 supporting the sensor unit 130. At the temperature detection point of the FBG sensor 131, the stretched member 120, which is heat resistant, is arranged on the outer circumferential surface of the support member 110. The stretched member 120 is, for example, a string-like or film-like member, and is arranged to be stretched across the opening of the groove 111. Hereinafter, the portion, of the stretched member 120, which is stretched across the opening of the groove 111 is referred to as a stretched portion 122.

At the temperature detection point of the FBG sensor 131, the sensor unit 130 is arranged outside the stretched portion 122. In addition, when the temperature detection unit 100 is inserted in the insertion hole 14h, the sensor unit 130 is pressed to the stretched portion 122 by the inner surface of the insertion hole 14h. However, the stretched portion 122 is hardly warped by this pressing force, and keeps the stretched state. Therefore, the protection tube 135 of the sensor unit 130 is pressed toward the center of the protection tube 135 by the inner surface of the insertion hole 14h and the outer side of the stretched portion 122, and is thus deformed in the radial direction. Consequently, movement, in the insertion hole 14h, of the temperature detection point of the sensor unit 130 is suppressed, and the temperature detection point of the sensor unit 130 is fixed at a predetermined position in the insertion hole 14h.

In addition, in the temperature detection unit 100 according to the present embodiment, the sensor unit 130 is supported by the support member 110 through the stretched portion 122 which is stretched across the groove 111 of the support member 110. That is, the sensor unit 130 is not in contact with the support member 110, i.e., is arranged to be separated from the support member 110. Therefore, the FBG sensor 131 of the sensor unit 130 becomes unlikely to be affected by the heat of the support member 110, and the temperature at the point M1 in the insertion hole 14h can be detected with high accuracy. The point M1 is the uppermost stream position in the heat flow direction, i.e., the position of the highest temperature, in the inner surface of the insertion hole 14h.

In other words, the temperature detection unit 100 in the mold for continuous casting 10 according to the present embodiment has the following characteristic features.

(a) The temperature detection unit 100 has the sensor unit 130 in which the FBG sensor 131 is inserted into the protection tube 135. The inner diameter of the protection tube 135 is preferably 0.5 mm or smaller.

(b) The sensor unit 130 is installed by being inserted in the insertion hole in the copper plate of the mold for continuous casting 10 while maintaining the state in which the sensor unit 130 is separated from the support member 110, to be fixed by use of the stretched member 120.

(c) At the temperature detection point of the sensor unit 130, the protection tube 135 is held between the inner surface of the insertion hole 14h and the stretched member 120.

According to the feature (a), damage to the FBG sensor 131 can be prevented by the protection tube 135. In addition, making the inner diameter of the protection tube 135 be 0.5 mm or smaller enables maintaining predetermined thermal responsiveness of the FBG sensor 131.

In addition, according to the feature (b), the FBG sensor 131 is unlikely to be affected by the heat of the support member 110, and the temperature of the copper plate at a predetermined position (for example, the point M1 indicated in FIG. 4) can be detected with high accuracy. Further, since the sensor unit 130 together with the support member 110 is inserted into and pulled out of the insertion hole in the copper plate of the mold for continuous casting 10, the insertion and the pullout of the sensor unit 130 are facilitated, and repeated use of the sensor unit 130 is enabled.

Furthermore, according to the feature (c), movement of the temperature detection point of the sensor unit 130 in the insertion hole can be suppressed, and temperature measurement at a predetermined position (for example, the point M1 indicated in FIG. 4) is enabled.

By the temperature detection unit 100 in the mold for continuous casting 10 as above, the temperature at a predetermined position in the copper plate (for example, the point 1\41 indicated in FIG. 4) can be detected with high accuracy. In addition, the temperature detection unit 100 can be easily attached to and detached from the copper plate. Hereinbelow, detailed configurations of respective portions constituting the temperature detection unit 100 are further explained.

(2) Detailed Configurations
(Support Member)

Figure 5:
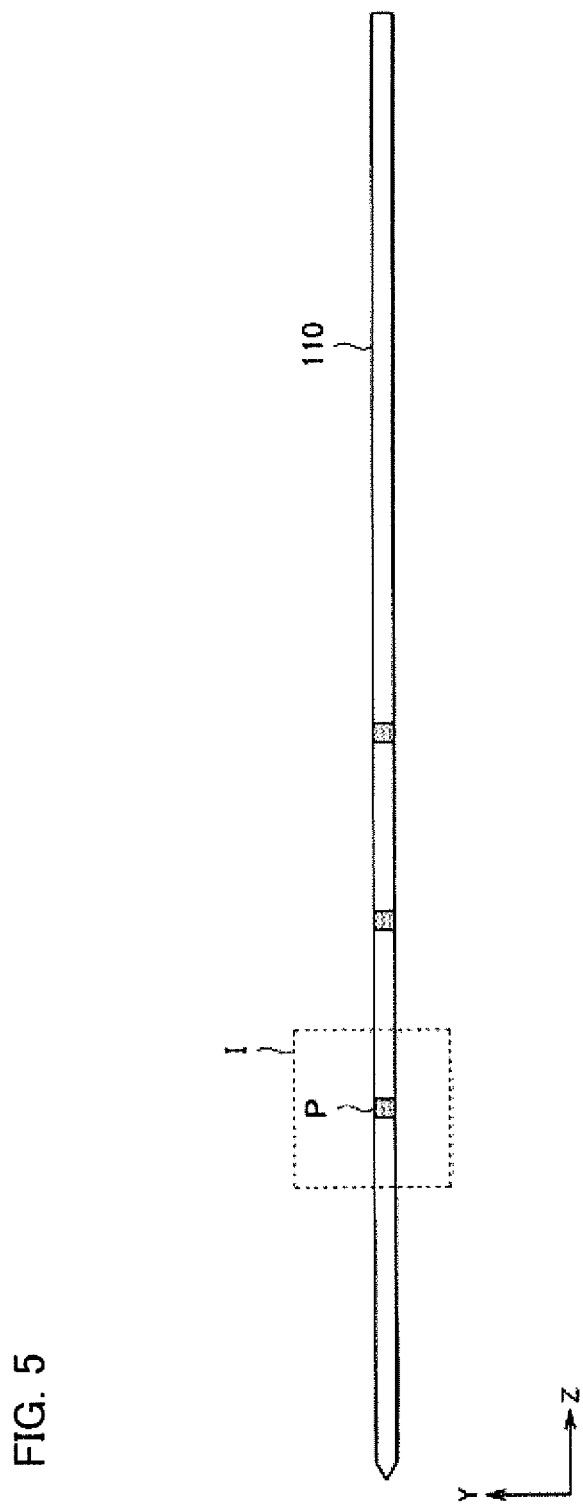
FIG. 5 is a schematic side diagram schematically illustrating a support member according to the above embodiment.
Figure 6:
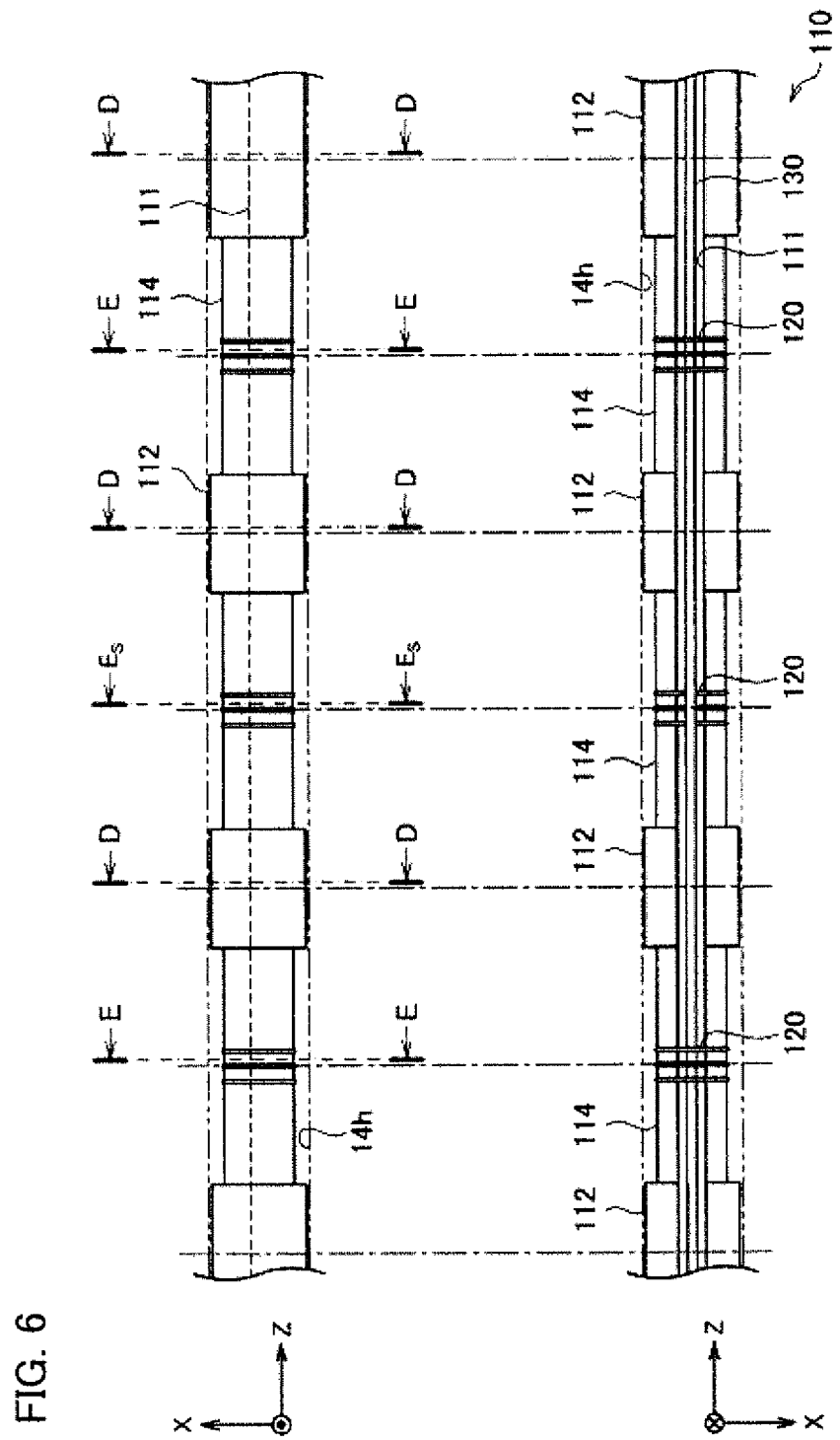
FIG. 6 shows partially magnified diagrams illustrating a region I of the support member illustrated in FIG. 5, where the upper half is a view from the right-hand side on the plane of FIG. 4, and the lower half is a view from the left-hand side on the plane of FIG. 4.

A structure of the support member 110 according to the present embodiment is illustrated in FIGS. 5 and 6. FIG. 5 is a schematic side diagram schematically illustrating the support member 110 according to the present embodiment. FIG. 6 shows a partially magnified diagram illustrating the support member 110 illustrated in FIG. 5, where the upper half is a view from the right side on the plane of FIG. 4, and the lower half is a view from the left side on the plane of FIG. 4.

The support member 110 is a member supporting the sensor unit 130. For example, a metal rod having a cylindrical shape (e.g., a copper rod) can be used as the support member 110. The sensor unit 130 is arranged on the support member 110 in such a manner that the longitudinal direction of the support member 110 corresponds to the longitudinal direction of the sensor unit 130. At this time, as illustrated in FIG. 5, one or more temperature detection points P in the sensor unit 130 may be arranged along the longitudinal direction of the support member 110.

As illustrated in FIG. 6, the support member 110 according to the present embodiment is composed of large diameter portions 112 and small diameter portions 114. The large diameter portions 112 prevent rattling of the support member 110 when the temperature detection unit 100 is inserted in the insertion hole 14h. Therefore, the large diameter portions 112 are formed to each have an outer diameter slightly smaller than the inner diameter of the insertion hole 14h in the copper plate 14A. For example, the clearance between the insertion hole 14h and the large diameter portions 112 may be approximately 0.1 mm. Alternatively, for example, the relationships between the clearance fit tolerances for holes and shafts, which are indicated in HS and the like, may be used.

On the other hand, the small diameter portions 114 each have an outer diameter smaller than the large diameter portions 112. The small diameter portions 114 are portions on which the stretched member 120 is arranged. For example, as illustrated in FIG. 4, the stretched member 120 is wound around the small diameter portions 114. The small diameter portions 114 are formed for clearing the thickness of the stretched member 120 such that the stretched member 120 does not come in contact with the inner surface of the insertion hole 14h when the temperature detection unit 100 is placed in the insertion hole 14h in the copper plate 14A. The diameter of the small diameter portions 114 is set according to the dimensions of various portions such as the thickness of the stretched member 120 and the outer diameter of the protection tube 135. For example, the diameter of the small diameter portions 114 is set approximately 0.2 mm smaller than the diameter of the large diameter portions 112. Further, the sensor unit 130 is fixed to the support member 110 in such a manner that the temperature detection point P is located on the small diameter portions 114.

The large diameter portions 112 and the small diameter portions 114, as described above, are alternately formed in the support member 110. However, it is unnecessary to alternately arrange the large diameter portions 112 and the small diameter portions 114 across the entire length of the support member 110 as illustrated in FIG. 6. In addition, although the length of each large diameter portion 112 in the longitudinal direction is set to approximately half of the length of each small diameter portion 114 in the support member 110 according to the present embodiment, the present invention is not limited to such an example, and the length of each large diameter portion 112 can be set appropriately. Further, the respective large diameter portions 112 and small diameter portions 114 may have different lengths.

In addition, as illustrated in the lower half of FIG. 6, the single groove 111 is formed in the support member 110 along the longitudinal direction. Although the support member 110 is realized by a metal member, the temperature of the support member 110 is not necessarily equal to the temperature of the inner surface of the insertion hole 14h because there is a clearance between the support member 110 and the insertion hole 14h in the mold 10. Further, if the sensor unit 130 is in contact with the support member 110, the FBG sensor 131 is also affected by the temperature of the support member 110, so that the accuracy of the measurement is lowered. Therefore, the groove 111 is formed in the support member 110 and the sensor unit 130 is fixed to the support member 110 along the groove 111 by using the stretched member 120 which is explained later, so that the sensor unit 130 and the support member 110 are separated from each other. Thus, it is possible to reduce the influence of the temperature which the sensor unit 130 receives from the support member 110. The manner of fixing the sensor unit 130 to the support member 110 will be described later.

In the present embodiment, the groove 111 in the support member 110 has a space having approximately a rectangular cross-sectional shape as illustrated in FIG. 4. However, the present invention is not limited to such an example, and the cross-sectional shape of the space of the groove 111 may be a triangular or semicircular shape.

(Stretched Member)

The stretched member 120 is a member which fixes the sensor unit 130 to the support member 110 and presses the protection tube 135 in the sensor unit 130 inserted in the insertion hole 14h in the copper plate 14A to the inner surface of the insertion hole 14h as illustrated in FIG. 4. It is preferable that a string-like or film-like member having elasticity and heat resistance be used as the stretched member 120. For example, a string of Kevlar (registered trademark) can be used as the stretched member 120. The stretched member 120 is arranged in plurality on the small diameter portions 114 of the support member 110, and stretched across the opening of the groove 111. For example, in the case where the string-like stretched member 120 is used, as illustrated in FIG. 4, the stretched member 120 is wound one to several turns around the outer circumference of each of the small diameter portions 114 of the support member 110 so as to be stretched across the opening of the groove 111. The portion, of the stretched member 120, stretched across the opening of the groove 111 is the stretched portion 122.

At the temperature detection points P of the sensor unit 130, the stretched member 120 presses the sensor unit 130 to the inner surface of the insertion hole 14h by the outer surface of the stretched portion 122 to fix the sensor unit 130. On the other hand, in the portions of the sensor unit 130 other than the temperature detection points P, the stretched member 120 in the portions located on the small diameter portions 114 of the support member 110, causes the sensor unit 130 to be located in the space of the groove 111 by the inner surface of the stretched portion 122. In the case where the portions in which the sensor unit 130 is located on the outer side of the stretched member 120 and the portions in which the sensor unit 130 is located on the inner side of the stretched member 120 are repeatedly arranged along the longitudinal direction, the sensor unit 130 is alternately combined with the stretched member 120 arranged on the support member 110. Thus, the sensor unit 130 is fixed to the support member 110 through the stretched member 120.

Details of the positional relationships between the support member 110, the stretched member 120, and the sensor unit 130 will be described later.

(Sensor Unit)

Figure 7:
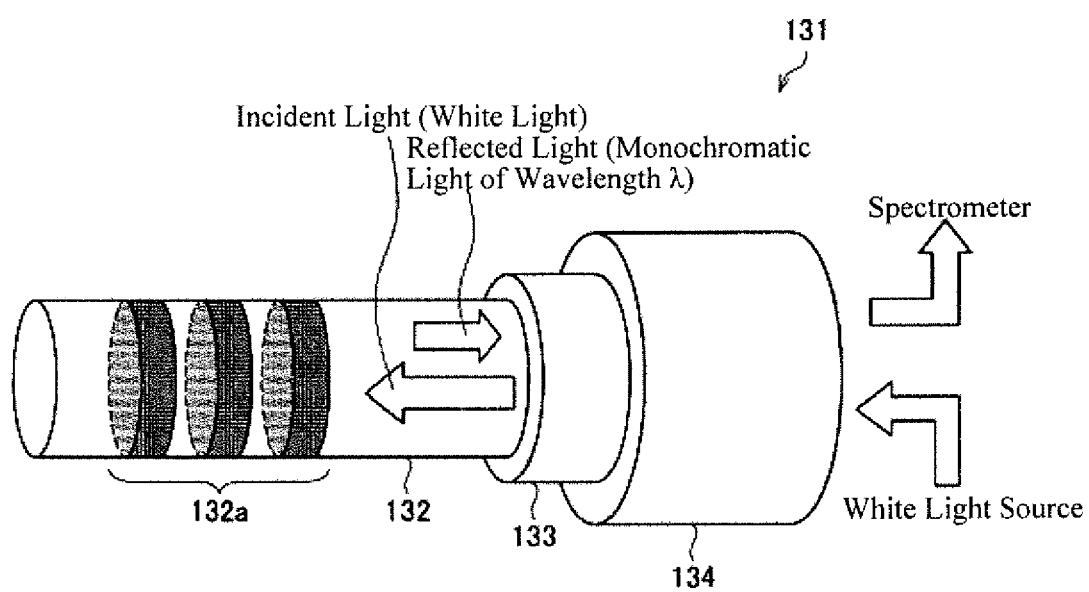
FIG. 7 is a schematic explanatory diagram illustrating the principle of an FBG sensor.
Figure 8:
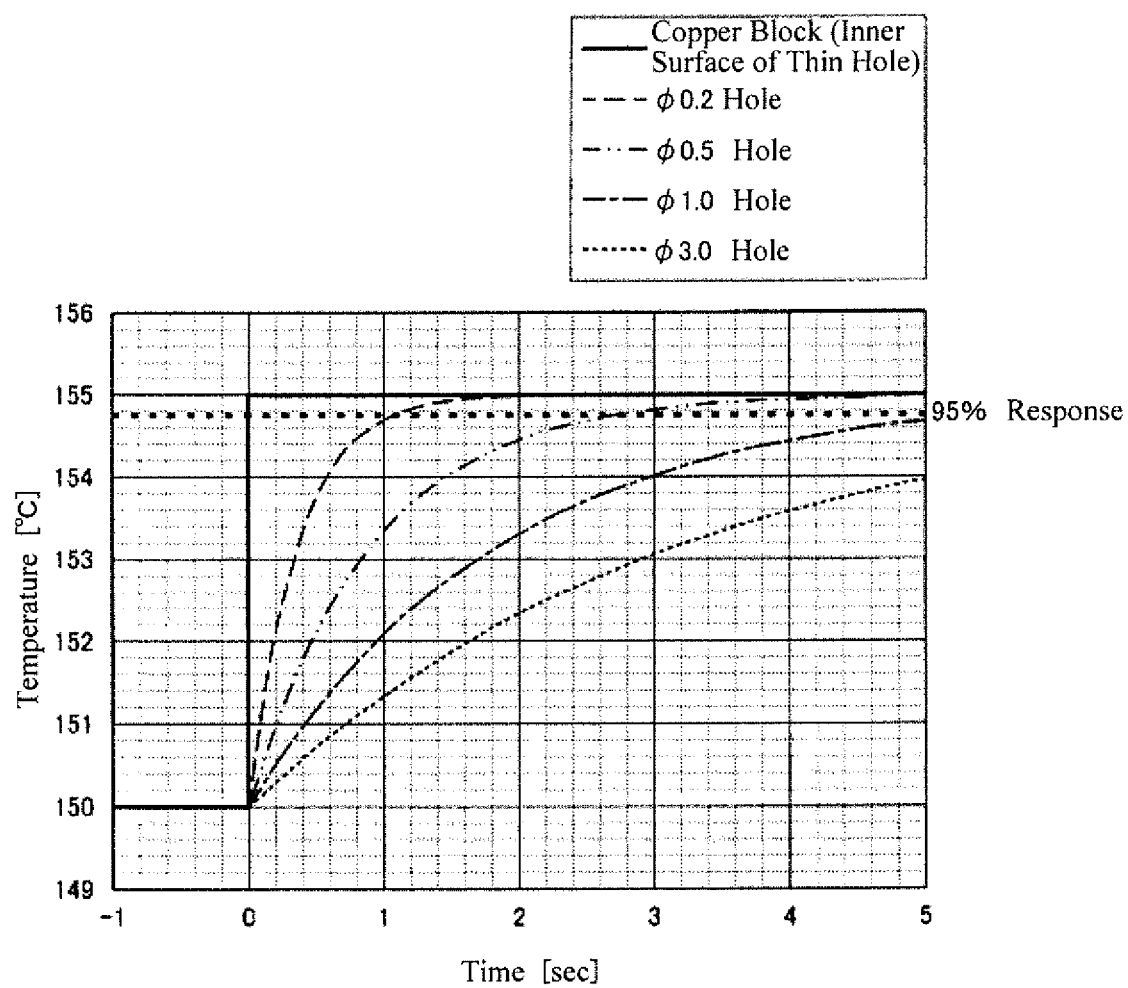
FIG. 8 is a graph indicating the responsiveness of the FBG sensor with various values of the diameter of a protection tube.

The configuration of the sensor unit 130 is explained with reference to FIGS. 7 and 8. FIG. 7 is a schematic explanatory diagram illustrating the principle of the FBG sensor 131. FIG. 8 is a graph indicating the responsiveness of the FBG sensor 131 with various values of the diameter of the protection tube 135. As illustrated in FIG. 4, the sensor unit 130 according to the present embodiment is constituted by the FBG sensor 131 for detecting the temperature of the copper plate 14A and the protection tube 135 for protecting the FBG sensor 131.

The FBG sensor 131 is a kind of an optical-fiber sensor, and detects a change of the temperature and distortion as a change of the wavelength of light. As illustrated in FIG. 7, the FBG sensor 131 is constituted by a core portion 132, a cladding portion 133, and a cover portion 134. Light propagates in the core portion 132. The cladding portion 133 covers the circumference of the core portion 132, and reflects stray light to return the light to the core portion 132. The cover portion 134 covers the circumference of the cladding portion 133, and protects the core portion 132 and the cladding portion 133 from the external environment. An FBG 132a is arranged in the core portion 132. The FBG 132a is formed by laminating a plurality of layers having different refractive indexes. The cover portion 134 may not be provided in the present invention.

The FBG 132a has a structure which allows reflection and transmission of only the light having a wavelength determined by the grating period and the refractive index. When the FBG 132a expands or contracts due to a change of the temperature, the grating period changes, and the wavelength of the light reflected by the FBG 132a changes. Therefore, the temperature at the position at which the FBG 132a is arranged can be obtained by injecting white light into the FBG sensor 131 and detecting the wavelength $\lambda$ of the reflected light by a spectrometer. That is, the position at which the FBG 132a is arranged is the temperature detection point P. Generally, a plurality of FBG 132a can be arranged in a single optical fiber, and the intervals therebetween can be approximately 10 mm.

The FBG sensor 131 is extremely thin, so that there is a possibility that the FBG sensor 131 breaks when the FBG sensor 131 alone is inserted into the insertion hole 14h in the copper plate 14A. Therefore, according to the present embodiment, damage to the FBG sensor 131 is prevented by protecting the FBG sensor 131 by the protection tube 135.

The protection tube 135 is a tubular member which can be deformed in a radial direction, and protects the FBG sensor 131 which is inserted in the tube. In the insertion hole 14h, the protection tube 135 is in contact with the inner surface of the insertion hole 14h. Therefore, in order to facilitate insertion of the sensor unit 130 together with the support member 110 into the insertion hole 14h, it is preferable that the protection tube 135 be formed of a material which is different from the material of the copper plate 14A and exhibits good slidability. For example, the protection tube 135 may be formed of a resin such as a polyimide.

The sensor unit 130 according to the present embodiment is formed by inserting the FBG sensor 131 in the protection tube 135. In the sensor unit 130, the measurement accuracy and responsiveness of the FBG sensor 131 are different depending on the relationship between the outer diameter of the FBG sensor 131 and the inner diameter of the protection tube 135. Therefore, the relationship between the outer diameter of the FBG sensor 131 and the inner diameter of a hole in which the FBG sensor 131 is inserted was investigated. As a result, it was found that the output responsiveness of the FBG sensor 131 decreases with increase in the inner diameter of a hole in which the FBG sensor 131 is inserted. FIG. 8 indicates results of a simulation for the output responsiveness of the FBG sensor 131 to the temperature variations in the thin hole, where a model in which the FBG sensor 131 is inserted in a thin hole formed in a copper block is assumed. When the relationship between the responsiveness and the inner diameter of the protection tube 135 in the present embodiment is considered, the inner surface of the thin hole in the above simulation can be regarded as corresponding to the inner surface of the protection tube in the present embodiment.

In the above simulation, the temperature rise in the FBG sensor arranged in the center of the thin hole when the temperature of the inner surface of the thin hole of the copper block is raised step by step from 150° C. to 155° C. was calculated, where it was assumed that the FBG sensor 131 is quartz having an outer diameter of 0.125 mm, and the gap between the thin hole and the FBG sensor 131 is filled with air, and the temperature of the inner surface of the thin hole is uniform. The time variations of the temperatures which are estimated to be detected by the FBG sensor 131 under the above conditions for the inner diameters of the thin hole as 0.2 mm, 0.5 mm, 1.0 mm, and 3.0 mm was obtained as indicated in FIG. 8.

FIG. 8 shows that the temperature at the inner surface of the thin hole can be detected in a shorter time when the inner diameter of the thin hole is smaller. Predetermined responsiveness in a predetermined time is necessary for correctly grasping the situation inside the mold during continuous casting, which varies moment by moment. For example, FIG. 8 indicates that in order to ensure the response of 95% or higher in five second, the inner diameter of the thin hole needs to be 0.5 mm or smaller.

This suggests that the thin hole be necessary also from the viewpoint of the variation of the responsiveness. If the FBG sensor 131 is fixed in the thin hole, the FBG sensor 131 is affected by elongation of the total length of the thin hole, so that the temperature measurement cannot be necessarily performed precisely. Therefore, the FBG sensor 131 needs to be loose from the thin hole.

On the other hand, in the case where the FBG sensor 131 is arranged loose from the thin hole, the FBG sensor 131 can move in the radial direction of the thin hole, so that the position of the FBG sensor 131 in the radial direction is not fixed to a single position. For example, the FBG sensor 131 can be located at the center of the thin hole, or in contact with the inner surface of the thin hole. At this time, the responsiveness of the FBG sensor 131 increases as the FBG sensor 131 becomes closer to the inner surface from the center of the thin hole. In some cases where the FBG sensor 131 is in contact with the inner surface of the hole, regardless of the inner diameter of the thin hole, the FBG sensor 131 exhibits the responsiveness sufficiently quicker than one second. Thus, when the inner diameter of the thin hole is greater, the difference in the response between the case where the FBG sensor 131 is at the center of the hole and the case where the FBG sensor 131 is in contact with the inner surface of the hole becomes greater, and the variation in the response time of the FBG sensor 131 becomes greater.

For example, while the variation in the response time due to variation in the position of the FBG sensor 131 in the radial direction is 0 to 0.92 seconds when the inner diameter of the thin hole is 0.5 mm, the variation in the response time is 0 to 3.18 seconds when the inner diameter of the thin hole is 3.0 mm. That is, when the variation in the response time is great as above, the reliability of the temperature measured by the FBG sensor 131 deteriorates.

Further, if clearance allowing either contact or non-contact exists between the protection tube 135 and the insertion hole 14h as well as between the FBG sensor 131 and the protection tube 135 unlike the present embodiment, the response of FIG. 8 is doubled in the responsiveness of the FBG sensor 131, and response delay greater than the result indicated in FIG. 8 occurs. In addition, in consideration that the positions of the protection tube 135 and the FBG sensor 131 in the radial direction relative to the insertion hole 14h vary, the variation of the responsiveness further increases, and the reliability of the measurement becomes further poor.

In consideration of above, the sensor unit 130 is formed by loosely inserting the FBG sensor 131 in the protection tube 135 having an inner diameter of 0.5 mm or smaller. Thus, the FBG sensor 131 is not affected by the elongation strain of the protection tube 135, and predetermined responsiveness in a predetermined time can be maintained.

It is sufficient that the protection tube 135 and the FBG sensor 131 are fixed to each other at at least one position. The protection tube 135 and the FBG sensor 131 are separated in the positions other than the fixed position, as illustrated in FIG. 4. It is preferable that the position at which the protection tube 135 and the FBG sensor 131 are fixed to each other be arranged at a position nearer to the opening of the insertion hole 14h than all the temperature detection points P of the FBG sensor 131. Thus, it is possible to prevent all the temperature detection points P of the FBG sensor 131 from being affected by the elongation strain of the protection tube 135. For example, the protection tube 135 and the FBG sensor 131 may be fixed to each other at an edge portion located on the opening side of the insertion hole 14h when the FBG sensor 131 is inserted in the insertion hole 14h, while being not fixed to each other in the other portions.

Figure 9:
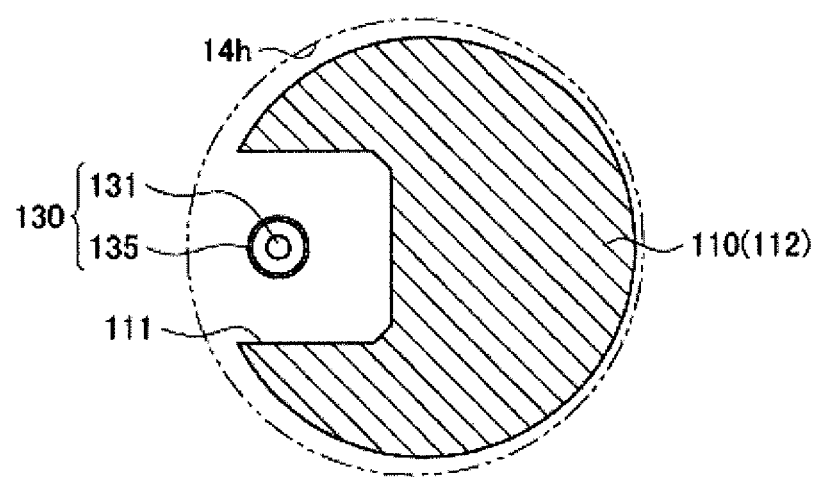
FIG. 9 is a cross-sectional diagram at the cutting plane line D-D in FIG. 6.
Figure 10:
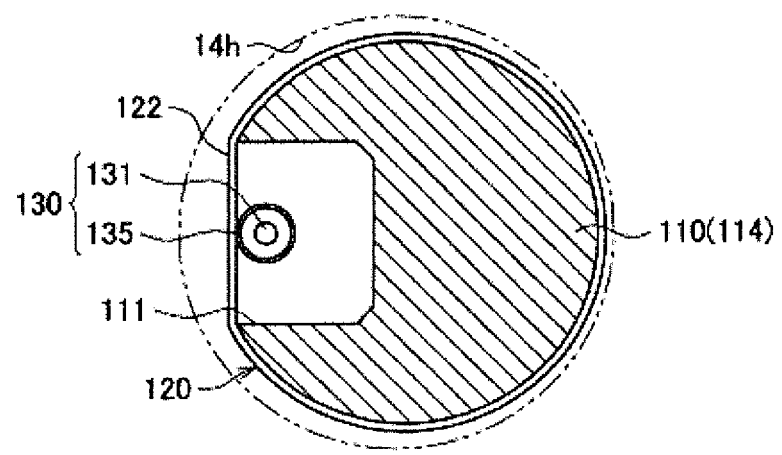
FIG. 10 is a cross-sectional diagram at the cutting plane line E-E in FIG. 6.
Figure 11:
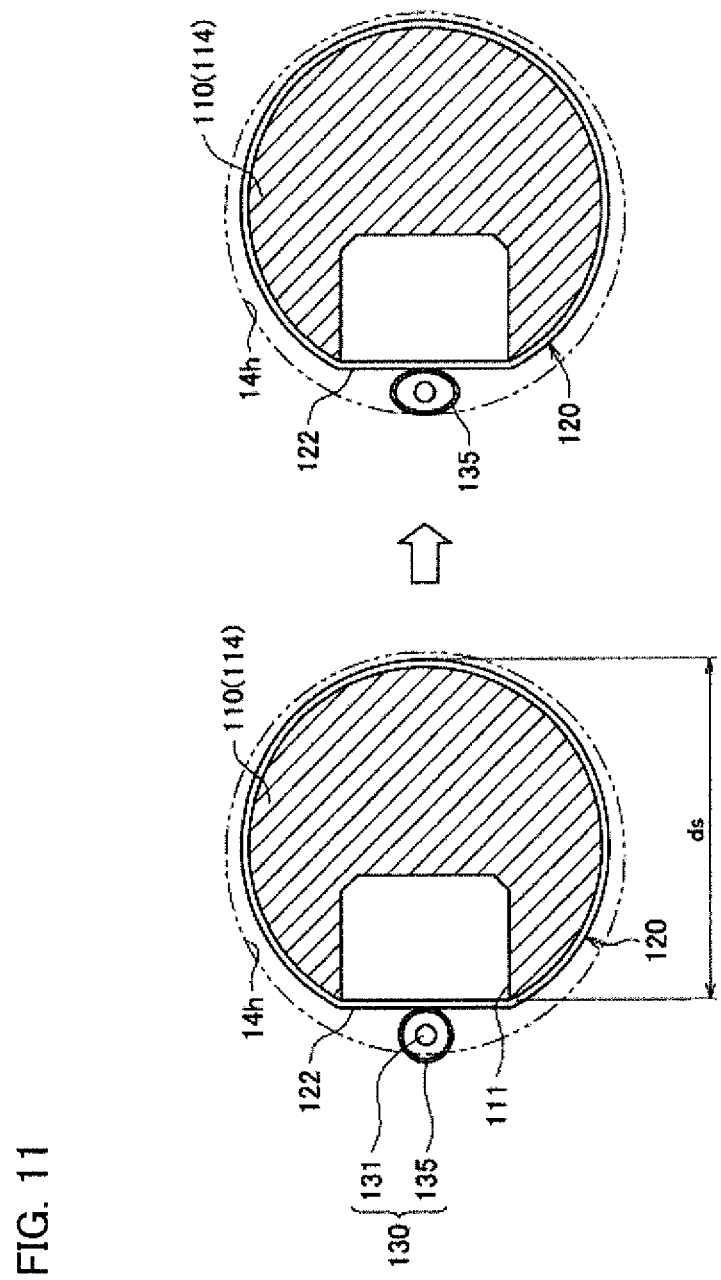
FIG. 11 shows a cross-sectional diagram at the cutting plane line Es-Es in FIG. 6, where the left-hand side in FIG. 11 illustrates the situation before insertion into the insertion hole, and the right-hand side in FIG. 11 illustrates the situation after the insertion into the insertion hole.

(3) Positional Relationship Between Insertion Hole and Temperature Detection Unit In the temperature detection unit 100 constituted by the members respectively described above, the sensor unit 130 is fixed to the support member 110 and further the temperature detection points P of the sensor unit 130 are fixed at the predetermined positions, by differentiating arrangement of the respective members at the respective positions along the longitudinal direction, i.e., the large diameter portions 112 of the support member 110, the small diameter portions 114 other than the temperature detection points P, and the small diameter portions 114 at the temperature detection points P. FIGS. 9 to 11 show cross-sectional views of the temperature detection unit 100 in the longitudinal direction. FIG. 9 is a cross-sectional view at the cutting plane line D-D in FIG. 6. FIG. 10 is a cross-sectional view at the cutting plane line E-E in FIG. 6. FIG. 11 shows a cross-sectional view at the cutting plane line Es-Es in FIG. 6, where the left-hand side in FIG. 11 illustrates the situation before insertion into the insertion hole 14h, and the right-hand side in FIG. 11 illustrates the situation after the insertion into the insertion hole 14h.

(Configuration in Large Diameter Portions)

First, in the large diameter portions 112 of the support member 110, in which the stretched member 120 is not arranged, the sensor unit 130 is located in the inner space of the groove 111 in the support member 110 as illustrated in FIG. 9. Since the large diameter portions 112 are portions which face the inner surface of the insertion hole 14h when the temperature detection unit 100 is inserted in the insertion hole 14*h*, the stretched member 120 is not arranged on the outer circumference of the large diameter portions 112. Since the sensor unit 130 is located in the inner space of the groove 111 at this time, the sensor unit 130 can be arranged not to touch the inner surface of the insertion hole 14*h*.

(Configuration in Small Diameter Portions)

The small diameter portions 114, which are arranged alternately with the large diameter portions 112 along the longitudinal direction of the support member 110, include small diameter portions in which the temperature detection points P are located and small diameter portions in which portions other than the temperature detection points P are located. The former small diameter portions and the latter small diameter portions have different configurations. It is preferable that at least one small diameter portion in which a portion other than the temperature detection points P is located be arranged between adjacent temperature detection points P. As described later, the purpose of this arrangement is to fix the sensor unit 130 to the support member 110 through the stretched member 120 by differentiating the configuration of the small diameter portions in which the temperature detection points P are located and the configuration of the small diameter portions in which portions other than the temperature detection points P are located. For example, in FIG. 6, when a temperature detection point P is located at the position of the cutting plane line Es-Es, portions other than the temperature detection points P are located in the small diameter portions adjacent to the small diameter portion in which the temperature detection point P is located, beyond the large diameter portion 112 (i.e., the small diameter portions on the cutting plane line E-E). In addition, it is preferable to arrange the large diameter portion 112 in the vicinity of the tip end of the protection tube 135.

Other than Temperature Detection Point

Among the small diameter portions 114 of the support member 110, on which the stretched member 120 is arranged, in the positions other than the temperature detection points P of the sensor unit 130, the sensor unit 130 is located in the space on the inner side of the stretched member 120 and the groove 111 as illustrated in FIG. 10. At this time, the sensor unit 130 is arranged in contact with the inner side of the stretched portion 122 of the stretched member 120 so as not to contact with the support member 110 and to be as distant as possible from the support member 110. Although the reason for this arrangement is explained later, this arrangement makes the sensor unit 130 unlikely to be affected by the heat from the support member 110, so that the accuracy of the temperature measurement can be enhanced. In addition, since the stretched member 120 confines the sensor unit 130 to the inside of the groove 111, the sensor unit 130 can be fixed to the support member 110.

Further, the sensor unit 130 is located along the groove 111 in the longitudinal direction as described above, and the sensor unit 130 is centered toward the width center of the groove 111 after the insertion into the insertion hole 14*h*. Therefore, even in the case where the temperature detection unit 100 is inserted into the deep (e.g., 400 mm) insertion hole 14*h*, the installation direction (the circumferential direction of the insertion hole) of the sensor unit 130 can be determined accurately.

Temperature Detection Point

Among the small diameter portions 114 of the support member 110, on which the stretched member 120 is arranged, in the temperature detection points P of the sensor unit 130, the sensor unit 130 is located on the outer side of the stretched member 120 as illustrated in FIG. 11. Before the temperature detection unit 100 is inserted in the insertion hole 14*h* in the copper plate 14A, the protection tube 135 is arranged in contact with the outer side of the stretched portion 122 of the stretched member 120 as illustrated in the diagram on the left-hand side of FIG. 11. At this time, the sensor unit 130 is arranged approximately straight in the longitudinal direction without being bent. Therefore, as illustrated in FIG. 6, the sensor unit 130 is arranged to alternately pass through the outside and the inside of the stretched member 120 in the temperature detection points P and the other portions, so that the sensor unit 130 is fixed in the manner of being woven through the stretched member 120 which is arranged in a predetermined position along the longitudinal direction. The fixing in the above manner realizes the arrangement of the sensor unit 130 in contact with the inner side of the stretched portion 122 of the stretched member 120 in the small diameter portions 114 in the positions other than the temperature detection points P as described above.

In the temperature detection point P, the protection tube 135 maintains an approximately circular shape. In this state, the maximum length of the temperature detection unit 100 in the radial direction, i.e., the length from the outer circumference of the protection tube 135 to the outer circumference of the large diameter portions 112 of the support member 110, is set slightly greater than the inner diameter of the insertion hole 14*h*.

When the support member 110 to which the sensor unit 130 is fixed is inserted in the insertion hole 14*h* in the copper plate 14A, as illustrated on the right-hand side of FIG. 11, the protector tube 135 is pressed by the stretched portion 122 to the inner surface of the insertion hole 14*h*, so that the protection tube 135 is deformed in the radial direction to become an elliptical shape. Since the temperature detection point P is pressed to and brought into contact with the inner surface of the insertion hole 14*h*, the contact areas between the inner surface of the insertion hole 14*h* and the outer side of the stretched portion 122, and the outer circumferential surface of the protection tube 135 increase, so that movement of the temperature detection point in the insertion hole 14*h* can be suppressed. In addition, the protection tube 135 becomes more likely to be located in the vicinity of the point M1, at which the distance between the insertion hole 14*h* and the stretched portion 122 is maximized, so that the installation position of the protection tube 135 (the position in the circumferential direction of the inner face of the insertion hole 14*h*) is stabilized. Therefore, the temperature detection point P can be surely fixed to a predetermined position, and the measurement accuracy can be enhanced. In addition, since the sensor unit 130, as well as the portions other than the temperature detection points P, is separated from the support member 110 by the groove 111, the sensor unit 130 is unlikely to be affected by the heat from the support member 110, so that the accuracy of the temperature measurement can be enhanced. Further, since the FBG sensor 131 is arranged loose from the protection tube 135, the FBG sensor 131 is not affected by the elongation strain of the protection tube 135, so that the accuracy of the temperature measurement can be enhanced.

A length ds from the opening of the groove 111 of the support member 110 to the opposed portion of the outer circumference (which is hereinafter referred to as "the sensor-portion width") is determined according to the width of the sensor unit 130 in the large diameter portions 112, the thickness of the stretched member 120, the outer diameter of the protection tube 135, and the inner diameter of the insertion hole 14*h*. For example, the temperature detection unit 100 may be configured by winding the string-like stretched member 120 having a diameter of 0.05 mm around the support member 110 having a diameter of 4 mm, and fixing the sensor unit 130 to the support member 110, where the sensor unit 130 is formed by inserting the FBG sensor 131 having a diameter of 0.125 mm in the protection tube 135 having an inner diameter of 0.5 mm and a thickness of 0.04 mm. At this time, the inner diameter of the insertion hole 14h in the copper plate 14A in which the temperature detection unit 100 is to be inserted can have a dimension of the outer diameter of the support member 110 plus clearance of approximately 0.1 mm.

In addition, the position, in the thickness direction (the Y-direction in FIG. 4), of the copper plate 14A which the protection tube 135 contacts is determined by the installation accuracy of the support member 110 in the circumferential direction. For example, in the case where the temperature gradient in the thickness direction of the copper plate is 20° C./mm, in order to make the measurement error 5° C. or less, it is necessary to determine the tolerance for the displacement in the thickness direction of the copper plate 14A to be 0.25 mm or smaller. When this is converted to the tolerance for the displacement in the circumferential direction, it must be suppressed to be approximately 0.73 mm to 0.83 mm. Therefore, it is preferable to determine the position in the circumferential direction by defining the position of the protection tube 135 in the thickness direction with the accuracy of 0.2 to 0.3 mm by using a pin or the like on the uppermost face or the like of the copper plate 14A. Thus, the measurement error of the FBG sensor 131 can be confined within a predetermined range by making the compression margin of the diameter of the protection tube 135, for example, 0.2 mm. Further, when the temperature detection unit 100 is inserted in the insertion hole 14h, the FBG sensor 131 is not fixed by being pinched by the protection tube 135. That is, the protection tube 135 can be brought in contact with the inner surface of the insertion hole 14h with high reliability and position accuracy while maintaining the FBG sensor 131 loose from the protection tube 135.

The compression margin, or ultimately the inner diameter, of the protection tube 135 is determined by the diameter of the optical fiber and the fitting tolerance between the insertion hole 14h and the support member 110. The compression margin varies by the difference between the maximum gap and the minimum gap (gap deviation) after the fitting. Therefore, in order to bring the protection tube 135 into stable contact with the insertion hole 14h, the compression margin needs to be equal to or greater than the gap deviation. When the precision of the fitting tolerance is increased, the gap deviation decreases, and the compression margin can also be decreased. In order to generally enable insertion and pulling of a rod having an outer diameter of 4 mm or smaller (the original material for the support member 110) into and out of the insertion hole 14h, both of the rod and the insertion hole 14h need to be manufactured with the tolerance of 0.048 mm or smaller according to JIS standard and the like. However, when the tolerance is decreased, the working cost of the hole and the support member increases. When the tolerance for the insertion hole and the rod is set to 0.048 mm, the gap deviation becomes approximately 0.1 mm, so that the compression margin needs to be greater than 0.1 mm.

In addition, in order that the FBG sensor 131 be loose from the protection tube 135 even after the deformation, the inner diameter of the protection tube 135 needs to be greater than the sum of the outer diameter of the FBG sensor 131 and the gap deviation. The outer diameter of the optical fiber for forming the FBG sensor 131 may be 0.05 mm to 0.15 mm. When suppression of the high working cost of the insertion hole 14h and the support member 110 as described above and the like are considered, the inner diameter of the protection tube 135 needs to be equal to or more than 0.15 mm (for 0.05 mm optical fiber) to 0.25 mm (for 0.15 mm optical fiber). In consideration of above and the simulation results of FIG. 8 indicating that the upper limit of the inner diameter of the protection tube 135 is 0.5 mm, the inner diameter of the protection tube 135 needs to be equal to or more than 0.15 mm and equal to or less than 0.5 mm.

Further, since the heat capacity can be reduced by reduction in the thicknesses of the protection tube 135 and thermal isolation from the support member 110 is possible, the FBG sensor 131 can accommodate to the temperature of the copper plate with high responsiveness. In addition, as illustrated in FIG. 8, when the inner diameter of the protection tube 135 is equal to or less than 0.5 mm, the FBG sensor 131 can respond to the temperature of the copper plate with sufficient responsiveness. Therefore, the temperature detection unit 100 according to the present embodiment can detect the temperature of the copper plate with high responsiveness by using the FBG sensor 131.

Furthermore, the temperature detection unit 100 is installed in the insertion hole 14h in the copper plate 14A in such a manner that the sensor unit 130 faces toward the molten-steel face side as illustrated in FIG. 4. Thus, the temperature at the molten-steel face can be estimated with higher reliability.

The configuration of the mold for continuous casting 10 according to the first embodiment of the present invention is explained above. In the mold for continuous casting 10 according to the present embodiment, a thin hole is opened from an upper face, a lower face, or a side face of the copper plates constituting the mold 10, and the temperature detection unit 100 is inserted. The temperature detection unit 100 is formed by fixing the sensor unit 130 to the support member 110 such as a copper rod through the stretched member 120, where the sensor unit 130 is formed by inserting the FBG sensor 131 in the protection tube 135 which has an inner diameter of 0.5 mm or smaller.

At this time, since the situation in which the sensor unit 130 is separated from the support member 110 is maintained by use of the stretched member 120, the sensor unit 130 is unlikely to be affected by the heat of the support member 110, and highly precise temperature measurement is enabled. In addition, since the sensor unit 130 together with the support member 110 is inserted into and pulled out of the insertion hole in the copper plate of the mold for continuous casting 10, the insertion and pulling out of the sensor unit 130 become easy, so that the sensor unit 130 can be used repeatedly.

Further, since at the temperature detection point of the sensor unit 130, the sensor unit 130 is held between the outer surface of the stretched portion 122 and the inner surface of the insertion hole 14h, movement, in the insertion hole, of the temperature detection point of the sensor unit 130 can be suppressed, and highly precise temperature measurement at a desired position is enabled.

2. Second Embodiment

Next, the mold for continuous casting 10 according to the second embodiment of the present invention is explained based on FIGS. 12 to 16. Although the main body of the mold is the same as the first embodiment as illustrated in FIGS. 1 to 3, the mold for continuous casting 10 according to the present embodiment is different from the first embodiment in that a temperature detection unit inserted in the insertion hole of the copper plate of the mold 10 is provided with two FBG sensors. Hereinafter, the explanation on the main body of the mold, which is the same as the first embodiment, is omitted, and the configuration of the temperature detection unit inserted in the insertion hole of the copper plate of the mold 10 is explained in detail.

<2-1. Outline of Configuration of Temperature Detection Unit>

Figure 12:
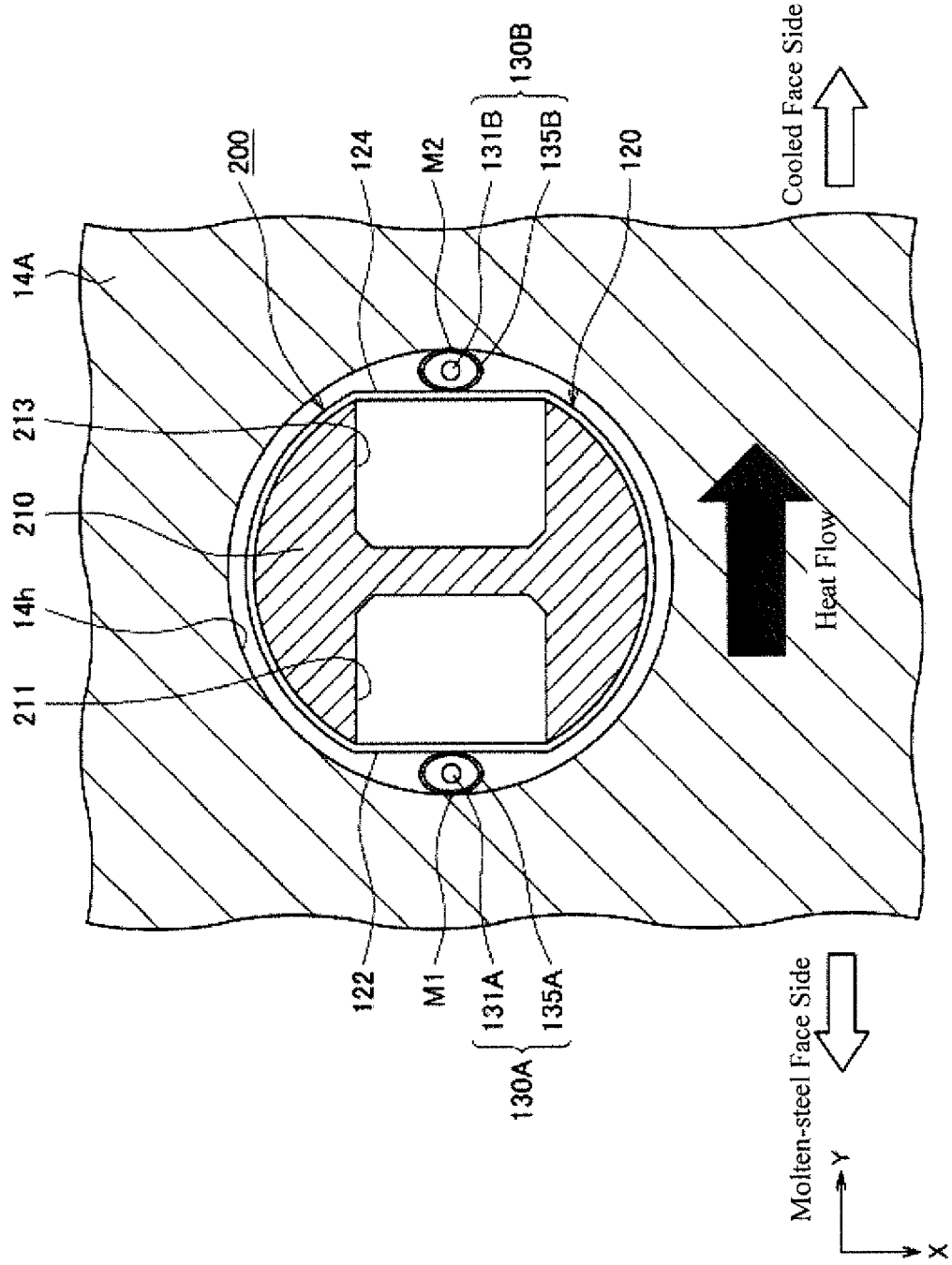
FIG. 12 is a schematic cross-sectional diagram illustrating a situation of a temperature detection point in a temperature detection unit according to the second embodiment, where the temperature detection unit is installed in an insertion hole in a copper plate in a mold for continuous casting according to the same embodiment of the present invention.

First, an outline of the temperature detection unit 200 is explained with reference to FIG. 12. FIG. 12 is a schematic cross-sectional diagram illustrating a situation of a temperature detection point in the temperature detection unit 200 according to the present embodiment, where the temperature detection unit 200 is installed in the insertion hole 14*h* in the copper plate 14A in the mold for continuous casting 10. Also in FIG. 12, similarly to FIG. 4, the molten-steel face 14*e* of the copper plate 14A is located on the left side of the illustration of FIG. 12, and the cooled face 14*d* of the copper plate 14A is located on the right side of the illustration of FIG. 12. In addition, in FIGS. 12 to 16, each member constituting the temperature detection unit 200 is illustrated in a partially magnified manner for the purpose of illustration. In the following explanations, the temperature detection unit 200 inserted in the insertion hole 14*h* in the copper plate 14A on the shorter side is explained as an example. However, the temperature detection unit 200 is also installed similarly in the insertion holes in the other copper plates in the mold 10.

As illustrated in FIG. 12, the temperature detection unit 200 according to the present embodiment is constituted by a support member 210, a stretched member 120, a first sensor unit 130A, and a second sensor unit 130B. The first sensor unit 130A and the second sensor unit 130B are formed respectively by inserting in hollow protection tubes 135A and 135B FBG sensors 131A and 131B which detect temperatures of the copper plate 14A. The first sensor unit 130A and the second sensor unit 130B may have the same configuration as the sensor unit 130 according to the first embodiment.

Two grooves 211 and 213 are formed along the longitudinal direction in the support member 210 which supports the first sensor unit 130A and the second sensor unit 130B. The two grooves 211 and 213 are formed on the same diameter. For example, the temperature detection unit 200 is installed in the insertion hole 14*h* in the copper plate 14A in such a manner that the opening of the first groove 211 corresponding to the first sensor unit 130A faces toward the molten-steel face side, and the opening of the second groove 213 corresponding to the second sensor unit 130B faces toward the cooled face side. Thus, measurement of a temperature distribution of the copper plate 14A in the thickness direction, i.e., a heat flux in the copper plate, is enabled based on the temperature measured by the first and second sensor units 130A and 130B. In addition, since the temperature at the molten-steel face can be estimated from two points in the copper plate, the accurate temperature at the molten-steel face can be obtained.

At the temperature detection points of the FBG sensors 131A and 131B, the stretched member 120, which is heat resistant, is arranged on the outer circumferential surface of the support member 210. The stretched member 120 is, for example, a string-like or film-like member as in the first embodiment. The stretched member 120 is arranged to be stretched across the openings of the grooves 211 and 213. Hereinafter, the portion of the stretched member 120 which is stretched across the opening of the first groove 211 is referred to as a first stretched portion 122, and the portion of the stretched member 120 which is stretched across the opening of the second groove 213 is referred to as a second stretched portion 124.

At the temperature detection points of the FBG sensors 131A and 131B, the first sensor unit 130A and the second sensor unit 130B are arranged outside the stretched portions. In addition, when the temperature detection unit 200 is inserted in the insertion hole 14*h*, the first sensor unit 130A and the second sensor unit 130B are pressed to the stretched portions by the inner surface of the insertion hole 14*h*. However, the stretched portions are hardly warped by this pressing force, and keep their stretched states. Therefore, the protection tubes 135A and 135B of the first sensor unit 130A and the second sensor unit 130B are pressed toward the centers of the protection tubes 135A and 135B by the inner surface of the insertion hole 14*h*, the outer side of the first stretched portion 122, and the outer side of the second stretched portion 124. Thus, the protection tubes 135A and 135B are deformed in the radial direction. Consequently, movement, in the insertion hole 14*h*, of the temperature detection points of the first sensor unit 130A and the second sensor unit 130B is suppressed, and the temperature detection points of the first sensor unit 130A and the second sensor unit 130B are respectively fixed at positions at which the distance between the insertion hole 14*h* and the first stretched portion 122 and the distance between the insertion hole 14*h* and the second stretched portion 124 are maximized. Therefore, when the support member 210 is inserted in such a manner that the position at which this distance is maximized coincides with the point M1, which is the position of the highest temperature in the inner surface of the insertion hole 14*h*, the first sensor unit 130A is fixed at the position of the point M1, and the second sensor unit 130E is fixed at the position of a point M2. As in the first embodiment, the point M1 is the uppermost stream position in the heat flow direction, i.e., the position of the highest temperature, in the inner surface of the insertion hole 14*h*. The point M2 is the lowermost stream position in the heat flow direction, i.e., the position of the lowest temperature, in the inner surface of the insertion hole 14*h*.

In addition, in the temperature detection unit 200 according to the present embodiment, similarly to the first embodiment, the first sensor unit 130A and the second sensor unit 130B are supported by the support member 210 through the first stretched portion 122 and the second stretched portion 124 which are stretched across the grooves 211 and 213 in the support member 210. This is, the first sensor unit 130A and the second sensor unit 130B are not in contact with the support member 210, and are arranged to be separated from the support member 210. Therefore, the FBG sensors 131A and 131B in the first sensor unit 130A and the second sensor unit 130B are unlikely to be affected by the heat of the support member 210, so that highly precise temperature measurement is enabled.

The temperature detection unit 200 in the mold for continuous casting 10 according to the present embodiment also has the characteristic features (a) to (c) as in the first embodiment, can detect the temperature of the copper plate with high accuracy, and can be easily attached to and detached from the copper plate. Further, since the temperature detection unit 200 according to the present embodiment can measure the temperatures at two points along the radial direction of the support member, measurement of a temperature distribution of the copper plate 14A in the thickness direction, i.e., a heat flux in the copper plate, is enabled.

Furthermore, since the temperature at the molten-steel face can be estimated from two points in the copper plate, the accurate temperature at the molten-steel face can be obtained.

<2-2. Positional Relationship Between Insertion Hole and Temperature Detection Unit>

Figure 13:
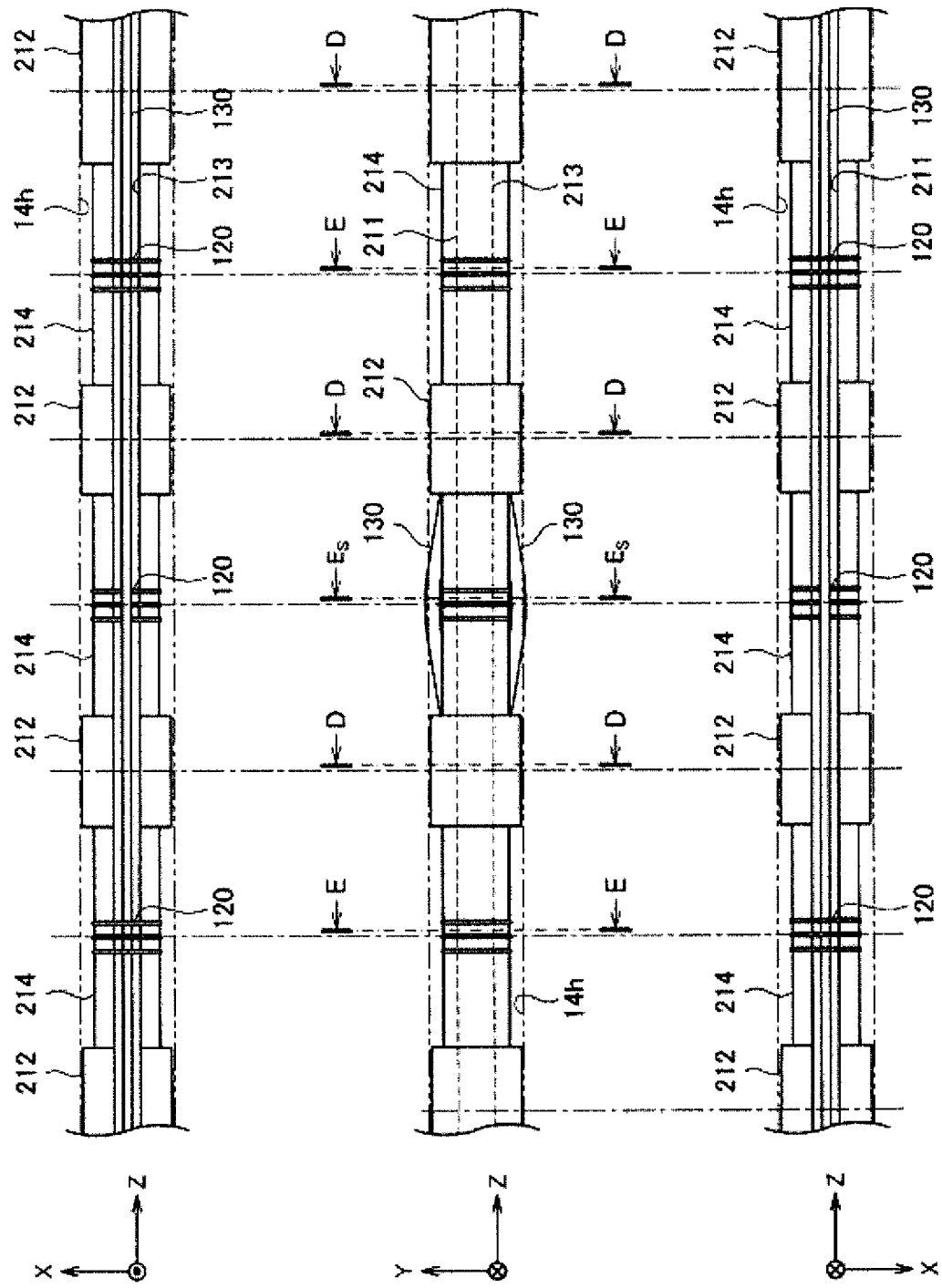
FIG. 13 shows partially magnified diagrams illustrating a support member, where the top illustrates a view as seen from the right-hand side on the plane of FIG. 12, the middle is a view as seen from the upper side of the plane of FIG. 12, and the bottom is a view as seen from the left-hand side on the plane of FIG. 12.
Figure 14:
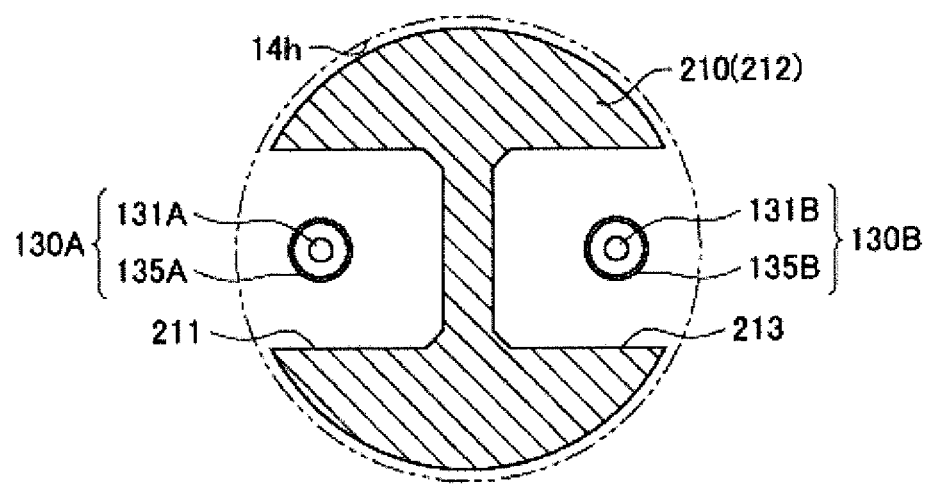
FIG. 14 is a cross-sectional diagram at the cutting plane line D-D in FIG. 13.
Figure 15:
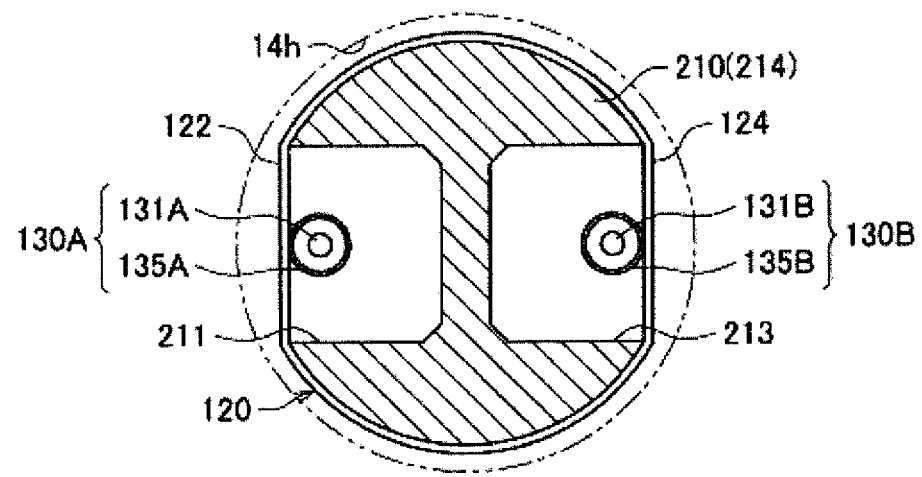
FIG. 15 is a cross-sectional diagram at the cutting plane line E-E in FIG. 13.
Figure 16:
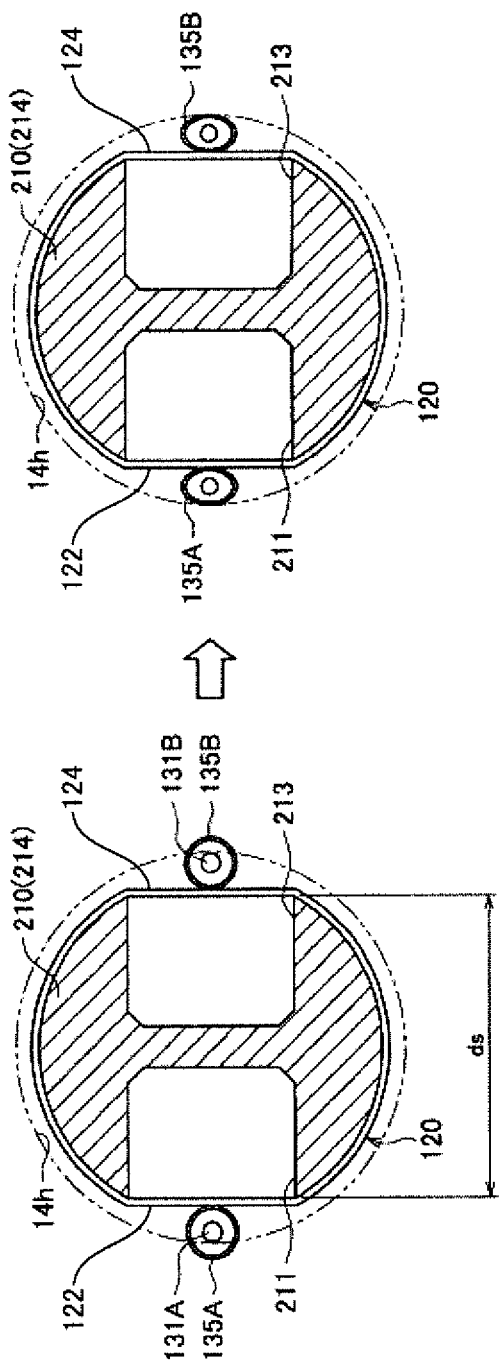
FIG. 16 shows a cross-sectional diagram at the cutting plane line Es-Es in FIG. 13, where the left-hand side in FIG. 16 illustrates the situation before insertion into the insertion hole, and the right-hand side in FIG. 16 illustrates the situation after the insertion into the insertion hole.

Hereinbelow, the configuration of the temperature detection unit 200 according to the present embodiment is explained in detail based on FIGS. 13 to 16. FIG. 13 shows a partially magnified diagram illustrating the support member 210, where the top of FIG. 13 illustrates a view from the right side on the plane of FIG. 12, the middle of FIG. 13 is a view from the upper side of the plane of FIG. 12, and the bottom of FIG. 13 is a view from the left side on the plane of FIG. 12. FIGS. 14 to 16 are cross-sectional diagrams of the temperature detection unit 200 in the longitudinal direction. FIG. 14 is a cross-sectional diagram at the cutting plane line D-D in FIG. 13. FIG. 15 is a cross-sectional diagram at the cutting plane line E-E in FIG. 13. FIG. 16 shows a cross-sectional diagram at the cutting plane line Es-Es in FIG. 13, where the left side in FIG. 16 illustrates the situation before insertion into the insertion hole 14h, and the right side in FIG. 16 illustrates the situation after the insertion into the insertion hole 14h. FIG. 13 illustrates a situation before insertion of the support member 210 into the insertion hole 14h, and the condition of the cutting plane line Es-Es in the middle of FIG. 13 corresponds to the left side in FIG. 16.

The support member 210 according to the present embodiment is a member supporting the sensor unit 130. The first sensor unit 130A and the second sensor unit 130B are respectively arranged in such a manner that the longitudinal direction of the support member 210 corresponds to the longitudinal directions of the first sensor unit 130A and the second sensor unit 130B. One or more temperature detection points P may be arranged in each of the first sensor unit 130A and the second sensor unit 130E along the longitudinal direction of the support member 210.

Similarly to the first embodiment, the support member 210 according to the present embodiment is also composed of large diameter portions 212 and small diameter portions 214 as illustrated in FIG. 13. The large diameter portions 212 prevent rattling of the support member 210 when the temperature detection unit 200 is inserted in the insertion hole 14h. On the other hand, the small diameter portions 214 have an outer diameter smaller than the large diameter portions 212. The small diameter portions 214 are portions on which the stretched member 120 is arranged. For example, as illustrated in FIG. 12, the stretched member 120 is wound around the small diameter portions 214. The small diameter portions 214 are formed for clearing the thickness of the stretched member 120 such that the stretched member 120 does not come in contact with the inner surface of the insertion hole 14h when the temperature detection unit 200 is placed in the insertion hole 14h in the copper plate 14A. The large diameter portions 212 and the small diameter portions 214 are alternately formed in the support member 210.

In addition, in the support member 210, as illustrated on the upper and lower sides of FIG. 13, the two grooves 211 and 213 are formed along the longitudinal direction. Although the support member 210 is realized by a metal member, there is clearance between the support member 210 and the insertion hole 14h in the mold 10. Therefore, the temperature of the support member 210 is not necessarily equal to the temperature of the inner surface of the insertion hole 14h. Further, if the sensor units 130A and 130B are in contact with the support member 210, the FBG sensors 131A and 131B are affected by the temperature of the support member 210, so that the measurement accuracy is lowered. Therefore, the grooves 211 and 213 are formed in the support member 210, and the sensor units 130A and 130B are fixed to the support member 210 along the grooves 211 and 213 by use of the stretched member 120, so that the sensor units 130A and 130B can be separated from the support member 210. Thus, influence of the temperature which the sensor units 130A and 130B receive from the support member 210 can be reduced.

Furthermore, in the present embodiment, the grooves 211 and 213 in the support member 210 have approximately rectangular cross-sectional shapes of the spaces as illustrated in FIG. 12. However, the present invention is not limited to such an example. The cross-sectional shapes of the spaces in the grooves 211 and 213 may be, for example, triangular or semicircular shapes. In addition, even in the case of the approximately rectangular cross-sectional shapes as illustrated in FIG. 12, the depths of the grooves 211 and 213 may be smaller.

In the temperature detection unit 200 according to the present embodiment, the two sensor units 130A and 130B are arranged on the same diameter of the support member 210. Since the sensor units 130A and 130B can be formed similarly to the sensor unit 130 according to the first embodiment, detailed explanations are omitted here. Also in the temperature detection unit 200 according to the present embodiment, the sensor units 130A and 130B are fixed to the support member 210 and the temperature detection points P in the sensor units 130A and 130B are fixed at predetermined positions by differentiating arrangement of the respective members at the respective positions along the longitudinal direction, i.e., the large diameter portions 212 of the support member 210, the small diameter portions 214 other than the temperature detection points P, and the small diameter portions 214 at the temperature detection points P.

(Configuration in Large Diameter Portion)

First, in the large diameter portions 212 of the support member 210, in which the stretched member 120 is not arranged, the sensor units 130A and 130B are located in the inner spaces of the grooves 211 and 213 in the support member 210 as illustrated in FIG. 14. Since the large diameter portions 212 are portions which face the inner surface of the insertion hole 14h when the temperature detection unit 200 is inserted in the insertion hole 14h, the stretched member 120 is not arranged on the outer circumference of the large diameter portions 212. Since the sensor units 130A and 130B are located in the inner spaces of the grooves 211 and 213 at this time, the sensor units 130A and 130B can be arranged not to touch the inner surface of the insertion hole 14h.

(Configuration in Small Diameter Portions)

The small diameter portions 214, which are arranged alternately with the large diameter portions 212 along the longitudinal direction of the support member 210, include small diameter portions in which the temperature detection points P are located and small diameter portions in which portions other than the temperature detection points P are located. The former small diameter portions and the latter small diameter portions have different configurations. It is preferable that at least one small diameter portion in which a portion other than the temperature detection points P is located be arranged between adjacent temperature detection points P. As described later, the purpose of this arrangement is to fix the sensor units 130A and 130B to the support member 210 through the stretched member 120 by differentiating the configuration of the small diameter portions in which the temperature detection points P are located and the configuration of the small diameter portions in which portions other than the temperature detection points P are located. For example, in FIG. 13, similarly to FIG. 6, when a temperature detection point P is located at the position of the cutting plane line Es-Es, portions other than the temperature detection points P are located in the small diameter portions adjacent to the small diameter portion in which the temperature detection point P is located, beyond the large diameter portions 212 (i.e., the small diameter portions on the cutting plane line E-E). In addition, it is preferable to arrange the large diameter portions 212 in the vicinities of the tip ends of the protection tubes 135A and 135B.

Other than Temperature Detection Point

Among the small diameter portions 214 of the support member 210, on which the stretched member 120 is arranged, in the positions other than the temperature detection points P of the sensor units 130A and 130B, the sensor units 130A and 130B are located in the spaces on the inner side of the stretched member 120 and the grooves 211 and 213 as illustrated in FIG. 15. At this time, the sensor units 130A and 130B are arranged in contact with the inner sides of the first stretched portion 122 and the second stretched portion 124 of the stretched member 120 so as not to contact with the support member 210 and to be as distant as possible from the support member 210. Thus, the sensor units 130A and 130B are unlikely to be affected by the heat from the support member 210, so that the accuracy of the temperature measurement can be enhanced. In addition, since the stretched member 120 confines the sensor units 130A and 130B to the insides of the grooves 211 and 213, the sensor units 130A and 130B can be fixed to the support member 210.

Further, the sensor units 130A and 130B are located along the grooves 211 and 213 in the longitudinal direction as described above, and the sensor units 130A and 130B are centered toward the width centers of the grooves 211 and 213 after the insertion into the insertion hole 14h, as explained later. Therefore, even in the case where the temperature detection unit 200 is inserted into the deep (e.g., 400 mm) insertion hole 14h, the installation directions (the circumferential directions of the insertion hole) of the sensor units 130A and 130B can be determined accurately.

Temperature Detection Point

Among the small diameter portions 214 of the support member 210, on which the stretched member 120 is arranged, in the temperature detection points P of the sensor units 130A and 130B, the sensor units 130A and 130B are located on the outer side of the stretched member 120 as illustrated in FIG. 16. Before the temperature detection unit 200 is inserted in the insertion hole 14h in the copper plate 14A, the protection tubes 135A and 135B are arranged in contact with the outer sides of the first stretched portion 122 and the second stretched portion 124 of the stretched member 120 as illustrated on the left side of FIG. 16. At this time, the sensor units 130A and 130B are arranged approximately straight in the longitudinal direction without being bent. Therefore, as illustrated in FIG. 13, the sensor units 130A and 130B are arranged to alternately pass through the outer side and the inner side of the stretched member 120 in the temperature detection points P and the other portions, so that the sensor units 130A and 130B are fixed in the manner of being woven through the stretched member 120 which is arranged in a predetermined position along the longitudinal direction.

In the temperature detection point P, the protection tubes 135A and 135B each maintain an approximately circular shape. In this state, the maximum length of the temperature detection unit 200 in the radial direction, i.e., the length from the outer circumference of the protection tube 135A to the outer circumference of the protection tube 135B, is set to be slightly greater than the inner diameter of the insertion hole 14h.

When the support member 210 to which the sensor units 130A and 130B are fixed is inserted into the insertion hole 14h in the copper plate 14A, as illustrated on the right side of FIG. 16, the protection tubes 135A and 135B are pressed by the first stretched portion 122 and the second stretched portion 124 to the inner surface of the insertion hole 14h, so that the protection tubes 135A and 135B are deformed in the radial direction to become elliptical shapes. Since the temperature detection points P are pressed to and brought into contact with the inner surface of the insertion hole 14h, the contact areas between the inner surface of the insertion hole 14h, and the outer sides of the first stretched portion 122 and the second stretched portion 124, and the outer circumferential surfaces of the protection tubes 135A and 135E increase, so that movement of the temperature detection points in the insertion hole 14h can be suppressed. In addition, the protection tube 135A becomes more likely to be located in the vicinity of the point M1, at which the distance between the insertion hole 14h and the first stretched portion 122 is maximized, so that the installation position of the protection tube 135A (the position in the circumferential direction of the inner surface of the insertion hole 14h) is stabilized. Similarly, the protection tube 135B becomes more likely to be located in the vicinity of the point M2, at which the distance between the insertion hole 14h and the second stretched portion 124 is maximized, so that the installation position of the protection tube 135B (the position in the circumferential direction of the inner surface of the insertion hole 14h) is stabilized. Therefore, the temperature detection points P can be surely fixed to predetermined positions, and the measurement accuracy can be enhanced. In addition, the sensor units 130A and 130B are distant from the support member 210 by the grooves 211 and 213, similar in the portions other than the temperature detection points P. Thus, the sensor units 130A and 130B are unlikely to be affected by the heat from the support member 210, so that the accuracy of the temperature measurement can be enhanced. Further, since the FBG sensors 131A and 131B are arranged loose from the protection tubes 135A and 135B, the FBG sensors 131A and 131B are not affected by the elongation strains of the protection tubes 135A and 135B, so that the accuracy of the temperature measurement can be enhanced.

The length ds from the opening of the groove 211 to the opening of the opposed groove 213 in the support member 210 (which is hereinafter referred to as "the sensor-portion width") is determined according to the widths of the sensor units 130A and 130B in the large diameter portions 212, the thickness of the stretched member 120, the outer diameters of the protection tubes 135A and 135B, and the inner diameter of the insertion hole 14h.

In addition, the positions in the thickness direction (the Y-direction in FIG. 12) of the copper plate 14A with which the protection tubes 135A and 135B contact are determined by the installation accuracy of the support member 210 in the circumferential direction. That is, a tolerance for the displacement in the thickness direction of the copper plate 14A, which is necessary for confining the measurement error within the allowable range, is calculated. Then, the calculated allowable range for the displacement is converted into a tolerance for the displacement in the circumferential direction, and compression margins of the diameters of the protection tubes 135A and 135B are determined. Thus, the measurement errors of the FBG sensors 131A and 131B can be confined within a predetermined range. Further, when the temperature detection unit 200 is inserted into the insertion hole 14h, the FBG sensors 131A and 131B are not fixed by being pinched by the protection tubes 135A and 135B, and the protection tubes 135A and 135B can be brought in contact with the inner surface of the insertion hole 14h with high reliability, while maintaining the FBG sensors 131A and 131E loose from the protection tubes 135A and 135B.

The compression margins, or ultimately the inner diameters, of the protection tubes 135A and 135B are determined by the diameter of the optical fibers and the fitting tolerance between the insertion hole 14h and the support member 210. The compression margin varies by the difference between the maximum gap and the minimum gap (gap deviation) after the fitting. Therefore, in order to bring the protection tubes 135A and 135B into stable contact with the insertion hole 14h, the compression margins need to be equal to or greater than the gap deviation. When the precision of the fitting tolerance is increased, the gap deviation decreases, and the compression margin can also be decreased. In order to generally enable insertion and pulling of a rod having an outer diameter of 4 mm or smaller (the original material for the support member 210) into and out of the insertion hole 14h, both of the rod and the insertion hole 14h need to be manufactured with the tolerance of 0.048 mm or smaller according to MS standard and the like. However, when the tolerance is decreased, the working cost of the hole and the support member increases. When the tolerance for the insertion hole and the rod is set to be 0.048 mm, the gap deviation becomes approximately 0.1 mm, so that the compression margin needs to be greater than 0.1 mm.

In addition, in order that the FBG sensors 131A and 131B be loose from the protection tubes 135A and 135B even after the deformation, the inner diameters of the protection tubes 135A and 135B each need to be greater than the sum of the outer diameter of the FBG sensor 131A or 131B, and the gap deviation. The outer diameters of the optical fibers for forming the FBG sensors 131A and 131B may be such as 0.05 mm to 0.15 mm. When suppression of the high working cost of the insertion hole 14h and the support member 210 as described above and the like are considered, the inner diameters of the protection tubes 135A and 135B need to be equal to or more than 0.15 mm (for 0.05 mm optical fiber) to 0.25 mm (for 0.15 mm optical fiber). In consideration of above and the fact that the upper limit of the inner diameters of the protection tubes 135A and 135B is 0.5 mm, the inner diameters of the protection tubes 135A and 135B need to be equal to or more than 0.15 mm and equal to or less than 0.5 mm.

Further, since the heat capacity can be reduced by reduction in the thicknesses of the protection tubes 135A and 135B and thermal isolation from the support member 210 is possible, the FBG sensors 131A and 131B can accommodate to the temperature of the copper plate with high responsiveness. In addition, as illustrated in FIG. 8, when the inner diameters of the protection tubes 135A and 135B are equal to or less than 0.5 mm, the FBG sensors 131A and 131B can respond to the temperature of the copper plate with sufficient responsiveness. Therefore, the temperature detection unit 200 according to the present embodiment can detect the temperature of the copper plate with high responsiveness by using the FBG sensors 131A and 131B.

Furthermore, the temperature detection unit 200 is installed in the insertion hole 14h in the copper plate 14A in such a manner that the first sensor unit 130A faces toward the molten-steel face side and the second sensor unit 130B faces toward the cooled face side as illustrated in FIG. 12. Thus, the temperature at the molten-steel face can be estimated with higher reliability. In addition, since the temperature detection unit 200 according to the present embodiment can measure temperatures at two points along the radial direction of the support member, measurement of a temperature distribution of the copper plate 14A in the thickness direction, i.e., a heat flux in the copper plate, is enabled. Further, since the temperature at the molten-steel face can be estimated from two points in the copper plate, the accurate temperature at the molten-steel face can be obtained. Consequently, highly precise measurement of (a distribution of) the temperature at the molten-steel face of the copper plate 14A is enabled. In addition, although conventionally only macroscopic heat fluxes as averages over the entire copper plate can be obtained, the present embodiment enables obtaining a detailed heat flux distribution. Thus, grasping of a further detailed process situation and a further detailed process analysis are enabled.

The configuration of the mold for continuous casting 10 according to the second embodiment of the present invention is explained above. According to the mold for continuous casting 10 of the present embodiment, the temperature detection unit 200 is inserted by making a thin hole from an upper, lower, or lateral face of the copper plate included in the mold 10. The temperature detection unit 200 is formed by fixing the first and second sensor units 130A and 130B, which are respectively formed by inserting the FBG sensors 131A and 131B in the protection tubes 135A and 135B of an inner diameter of 0.5 mm or smaller, to the support member 210 such as a copper rod through the stretched member 120.

At this time, since the situation in which the sensor units 130A and 130B are separated from the support member 210 is maintained by use of the stretched member 120, the sensor units 130A and 130B are unlikely to be affected by the heat of the support member 210, and highly precise temperature measurement is enabled. In addition, since the sensor units 130A and 130B together with the support member 210 are inserted into and pulled out of the insertion hole in the copper plate of the mold for continuous casting 10, the insertion and pulling out of the sensor units 130A and 130B become easy, so that the sensor units 130A and 130B can be used repeatedly.

Further, since at the temperature detection points of the sensor units 130A and 130B, the sensor units 130A and 130B are each held between the outer surface of the first stretched portion 122 and the second stretched portion 124, and the inner surface of the insertion hole 14h, movement of the temperature detection points of the sensor units 130A and 130B in the insertion hole can be suppressed, and highly precise temperature measurement at a desired position is enabled. Furthermore, since the temperature detection unit 200 according to the present embodiment can measure temperatures at two points along the radial direction of the support member, measurement of a temperature distribution of the copper plate 14A in the thickness direction, i.e., a heat flux in the copper plate, is enabled. In addition, since the temperature at the molten-steel face can be estimated from two points in the copper plate, the accurate temperature at the molten-steel face can be obtained.

Example

Figure 17:
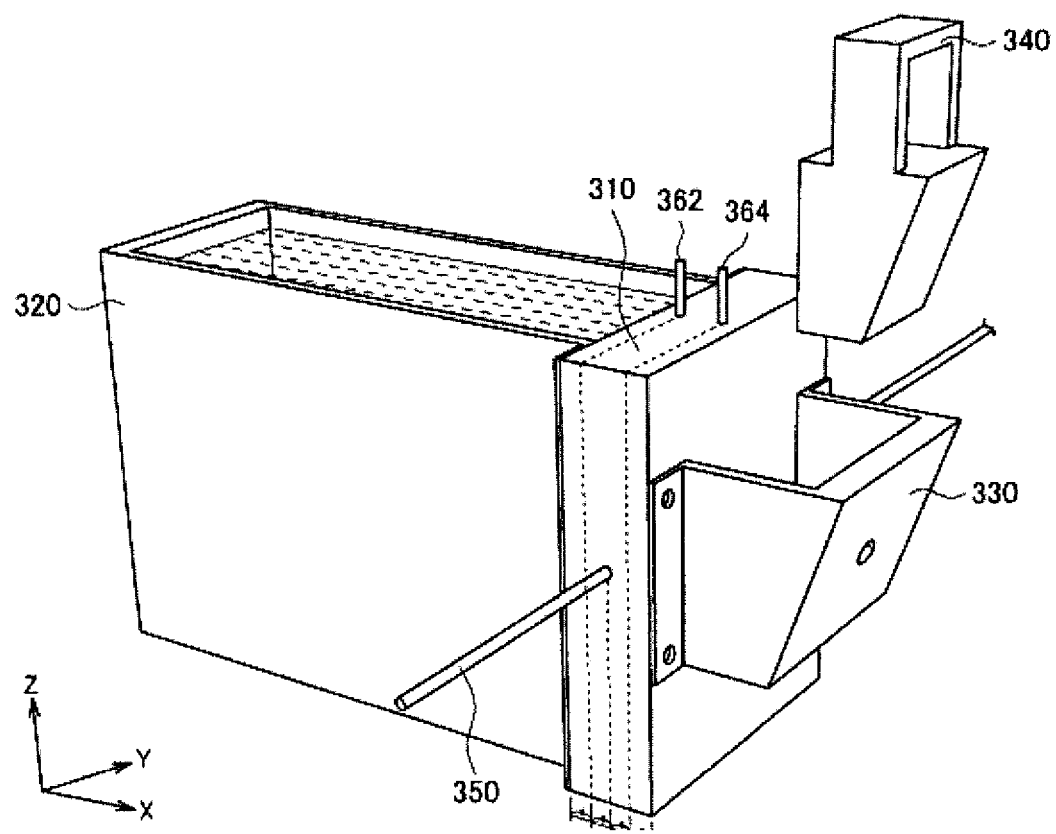
FIG. 17 is a schematic perspective diagram schematically illustrating experimental equipment in the example.

In order to verify the effect of the present invention, temperatures measured by the temperature detection unit 100 according to the first embodiment of the present invention and the responsiveness of the temperature detection unit 100 was verified. In this example, experimental equipment simulating a situation of a mold in a continuous casting machine as illustrated in FIG. 17 was used. In the experimental equipment of FIG. 17, a face of a copper plate 310 was cooled by arranging on one face side of the copper plate 310 corresponding to the copper plate of the mold a water tank 320 in which cooling water was reserved, and a case 330 for putting in of a heated block 340 simulating molten steel was arranged on the opposite face. A temperature detection unit 350 according to the present invention provided with an FBG sensor was arranged in the center in the thickness direction of the copper plate 310, and two thermocouples 362 and 364 were arranged on both sides in the thickness direction of the temperature detection unit 350. The temperature detection unit 350 was arranged in the middle position in the thickness direction between the thermocouples 362 and 364.

In the temperature detection unit 350, a polyimide tube having an inner diameter of 0.5 mm and a length of 400 mm was used as the protection tube, and the sensor unit was formed by inserting an FBG sensor having a diameter of 0.125 mm into the polyimide tube. A cylindrical rod of copper having an outer diameter of 4 mm and a length of 400 mm was used as the support member, and the sensor unit was fixed to a small diameter portion of the support member by use of a string of Kevlar (registered trademark). When the temperature detection unit 350 was inserted in an insertion hole in the copper plate 310, the temperature detection unit 350 was in a situation as illustrated in FIG. 4 at a temperature detection point. The temperature detection unit 350 had such a configuration that the polyimide tube was separated from the copper rod, and pressed to the inner surface of the insertion hole in the copper plate 310. At this time, the compression margin of the polyimide tube was approximately 0.2 mm.

On the other hand, sheathed thermocouples having a diameter of 0.5 mm were used as the thermocouples 362 and 364. The responsiveness (63%) of these sheathed thermocouples is 15 ms. In addition, in order to measure the temperature of the heated block, the same thermocouple as above was arranged in the case 330.

The heated block 340 at approximately 300° C. was put into the case 330 arranged on the copper plate 310 such that the heated block 340 was brought into contact with a face of the copper plate 310. Then, the outputs of the temperature detection unit 350, the two thermocouples 362 and 364, and the thermocouple inside the case 330 were sampled at every 0.2 seconds. In this example, it was possible to judge whether or not the contact between the temperature detection unit 350 and the copper plate 310 was good, based on whether or not a temperature rise of approximately 15° C. in five seconds occurred after the contact of the copper plate 310 with the heated block 340. At the same time, the accuracy of the temperatures was also evaluated by use of the above data and comparison with the thermocouples.

Figure 18:
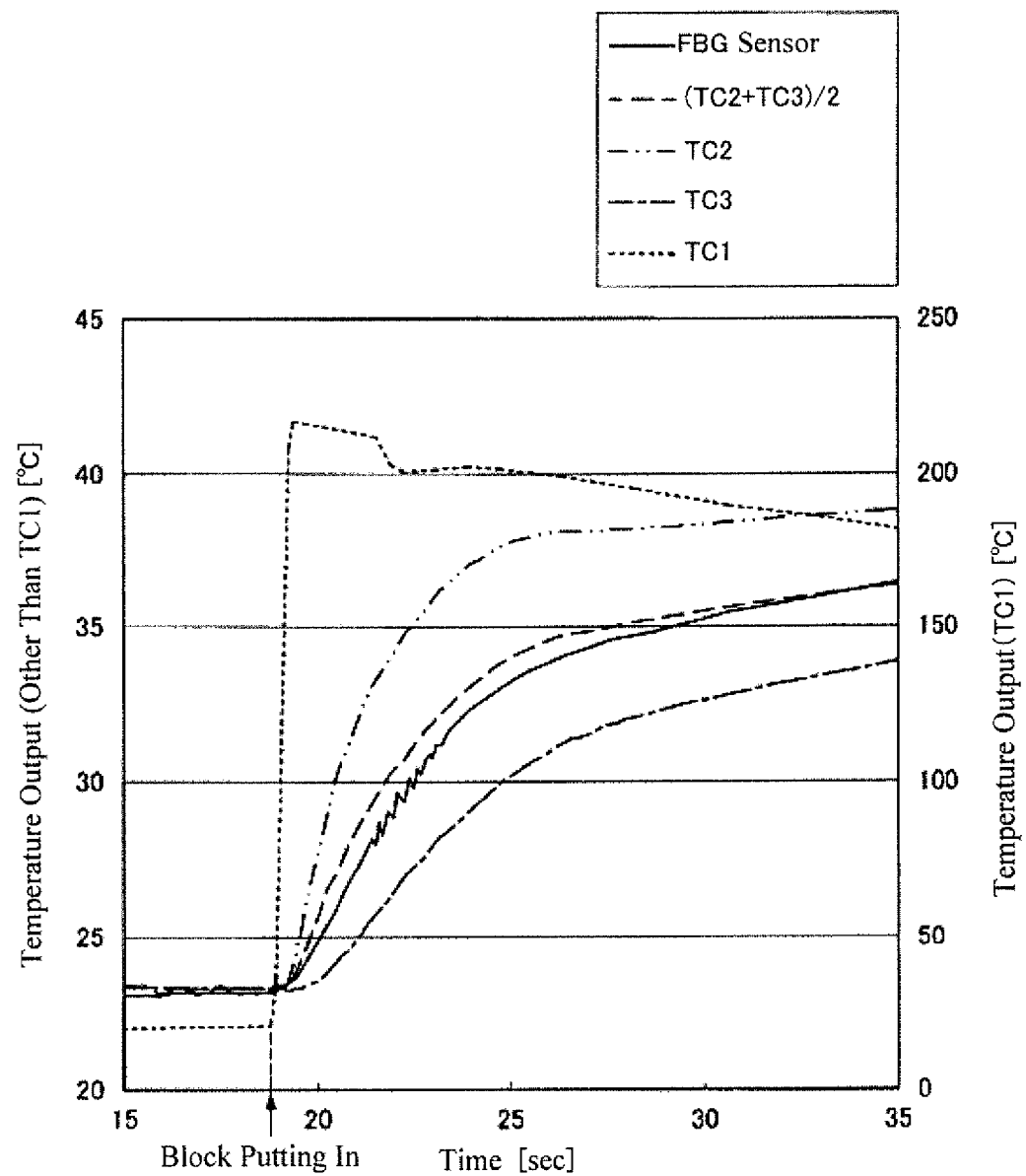
FIG. 18 is a graph indicating the results of outputs from the temperature detection unit, two thermocouples, and thermocouples inside a case, after putting in of a heated block.
Figure 19:
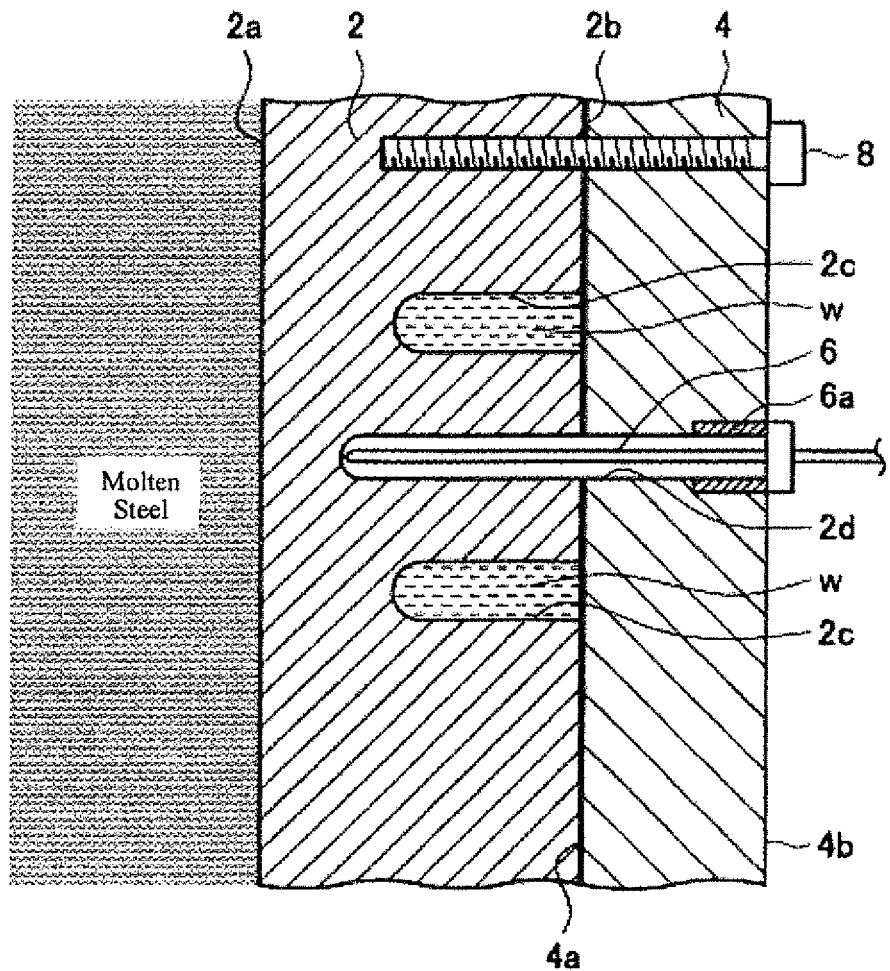
FIG. 19 is an explanatory diagram illustrating a conventional method of measuring the temperature of a copper plate by using a thermocouple.

FIG. 18 indicates the results of outputs from the temperature detection unit 350, the two thermocouples 362 and 364, and the thermocouples inside the case 330, after putting in of the heated block. In FIG. 18, "FBG sensor" denotes the output of the temperature detection unit 350, "TC1" denotes the output of the thermocouple inside the case 330, "TC2" denotes the output of the thermocouple 362, "TC3" denotes the output of the thermocouple 364, and the average of the thermocouples 362 and 364 is indicated by "(TC2+TC3)/2".

As illustrated in FIG. 18, when the heated block 340 was put into the case 330, the temperature TC1 suddenly rose. Slightly after the rise of TC1, the rises in TC2, FBG sensor, and TC3 occurred in this order. In addition, five seconds after the putting in of the heated block 340 (at the time of 24 seconds), the difference between the temperatures TC2 and TC3 became approximately 7.95° C. That is, it is found that a temperature distribution in the copper plate exceeding the precisions of the thermocouples and the FBG sensor has occurred.

Further, the time transition of the temperature in the output of the FBG sensor is approximately identical to the time transition of the temperature in the average ((TC2+TC3)/2) of the thermocouples 362 and 364. Therefore, it is possible to consider that the FBG sensor detected the temperature of the copper plate with high accuracy. As for the deviation of the output of the FBG sensor from the average ((TC2+TC3)/2) of the thermocouples 362 and 364, the mean error=0.77° C., $\sigma$=0.75° C., the maximum error=4.4° C., and the minimum error=−3.0° C. That is, a satisfactory result achieving a target value ±5° C. was obtained. In addition, it was also confirmed that boring of a hole having an inner diameter of 3 to 4 mm and a depth of 400 mm in a copper plate for a mold is possible, and the temperature detection unit 350 formed with a support member made by a rod of copper or stainless steel having a diameter and a length which are approximately equal to those of the hole can be easily inserted into and pulled out of the hole.

As explained above, it was confirmed that when the temperature detection unit according to the present invention is used, the temperature of the copper plate can be satisfactorily detected without being affected by a strain of a protection tube or a copper plate of a mold.

Although preferred embodiments of the present invention have been explained in detail with reference to the accompanying drawings, the present invention is not limited to such examples. It is apparent that any person skilled in the art to which the present invention pertains will be able to reach various modifications and corrections within the category of the technical ideas described in the claims, and it is understood that such modifications and corrections naturally belong to the scope of the present invention.

LIST OF REFERENCE SIGNS

10 Mold for Continuous Casting
12A, 12B, 14A, 14B Copper Plate
14h Insertion Hole
16 Partition Plate
100, 200 Temperature Detection Unit
110, 210 Support Member
111, 211, 213 Groove
112, 212 Large Diameter Portion
114, 214 Small Diameter Portion
120 Stretched Member
130 (130A, 130B) Sensor Unit
131 (131A, 131B) FBG Sensor
135 (135A, 135B) Protection Tube

The invention claimed is:
1. A mold for continuous casting comprising:
a main body of the mold for continuous casting; and
a temperature detection unit which is inserted in an insertion hole formed in the main body of the mold, and detects temperature inside the mold;

wherein the temperature detection unit includes,
an FBG (Fiber Bragg Grating) sensor inserted in a protection tube which can be deformed in a radial direction, and
a support member in which a groove is formed along a longitudinal direction, and which supports the FBG sensor along the longitudinal direction; and
at a temperature detection point, the protection tube in which the FBG sensor is inserted is held between a stretched member stretched across an opening of the groove in the support member and an inner surface of the insertion hole.

2. A mold for continuous casting comprising:
a main body of the mold for continuous casting; and
a temperature detection unit which is inserted in an insertion hole formed in the main body of the mold, and detects temperature inside the mold;
wherein the temperature detection unit includes,
two FBG sensors respectively inserted in protection tubes which can be deformed in a radial direction, and
a support member in which two grooves opposed in a radial direction are formed along a longitudinal direction, and which supports the two FBG sensors along the longitudinal direction; and
at temperature detection points, the protection tubes in which the FBG sensors are inserted are each held between a stretched member stretched across openings of the respective two grooves in the support member and an inner surface of the insertion hole.

3. The mold for continuous casting according to claim 2, wherein in the insertion hole, one of the FBG sensors is arranged on a molten-steel face side of the main body of the mold, and the other of the FBG sensors is arranged on a cooled face side of the main body of the mold.

4. The mold for continuous casting according to claim 1, wherein the temperature detection unit is inserted from at least one of an upper, lower, and lateral sides of the main body of the mold.

5. The mold for continuous casting according to claim 1, wherein the FBG sensor is arranged on a diameter, in a thickness direction of the main body of the mold, of the insertion hole.

6. The mold for continuous casting according to claim 1, wherein the protection tube is formed to each have an inner diameter of no more than 0.5 mm, and the inner diameter of the protection tube is greater than an outer diameter of the FBG sensor even when the protection tube is deformed in the radial direction.

7. The mold for continuous casting according to claim 1, wherein the support member includes, along the longitudinal direction, a small diameter portion on which the stretched member is arranged and a large diameter portion having a diameter greater than the small diameter portion, and the temperature detection point of the FBG sensor is located in the small diameter portion.

8. The mold for continuous casting according to claim 7, wherein the FBG sensor is arranged between an outer side of the stretched member and an inner surface of the insertion hole at the temperature detection point, and arranged on an inner side of the stretched member opposed to an inner surface of the groove in the small diameter portion not containing the temperature detection point.

9. The mold for continuous casting according to claim 1, wherein the stretched member is made of a heat-resistant fiber.

10. The mold for continuous casting according to claim 2, wherein the temperature detection unit is inserted from at least one of an upper, lower, and lateral sides of the main body of the mold.

11. The mold for continuous casting according to claim 3, wherein the temperature detection unit is inserted from at least one of an upper, lower, and lateral sides of the main body of the mold.

12. The mold for continuous casting according to claim 2, wherein the FBG sensors are arranged on a diameter, in a thickness direction of the main body of the mold, of the insertion hole.

13. The mold for continuous casting according to claim 3, wherein the FBG sensors are arranged on a diameter, in a thickness direction of the main body of the mold, of the insertion hole.

14. The mold for continuous casting according to claim 2, wherein the protection tubes are formed to each have an inner diameter of no more than 0.5 mm, and the inner diameters of the protection tubes are greater than outer diameters of the FBG sensors even when the protection tubes are deformed in the radial direction.

15. The mold for continuous casting according to claim 3, wherein the protection tubes are formed to each have an inner diameter of no more than 0.5 mm, and the inner diameters of the protection tubes are greater than outer diameters of the FBG sensors even when the protection tubes are deformed in the radial direction.

16. The mold for continuous casting according to claim 2, wherein the support member includes, along the longitudinal direction, a small diameter portion on which the stretched member is arranged and a large diameter portion having a diameter greater than the small diameter portion, and the temperature detection points of the FBG sensors are located in the small diameter portion.

17. The mold for continuous casting according to claim 3, wherein the support member includes, along the longitudinal direction, a small diameter portion on which the stretched member is arranged and a large diameter portion having a diameter greater than the small diameter portion, and the temperature detection points of the FBG sensors are located in the small diameter portion.

18. The mold for continuous casting according to claim 16, wherein the FBG sensors are arranged between an outer side of the stretched member and an inner surface of the insertion hole at the temperature detection points, and arranged on an inner side of the stretched member opposed to inner surfaces of the grooves in the small diameter portion not containing the temperature detection points.

19. The mold for continuous casting according to claim 17, wherein the FBG sensors are arranged between an outer side of the stretched member and an inner surface of the insertion hole at the temperature detection points, and arranged on an inner side of the stretched member opposed to inner surfaces of the grooves in the small diameter portion not containing the temperature detection points.

20. The mold for continuous casting according to claim 2, wherein the stretched member is made of a heat-resistant fiber.

* * * * *